(12) United States Patent
Devan, Jr. et al.

(10) Patent No.: US 12,067,541 B2
(45) Date of Patent: *Aug. 20, 2024

(54) INTEGRATED ELECTRONIC DISBURSEMENT AND CASH FLOW MANAGEMENT SYSTEM AND METHOD

(71) Applicant: JPMorgan Chase Bank, N.A., New York, NY (US)

(72) Inventors: Stanley M. Devan, Jr., Mount Royal, NJ (US); Steve Markwell, Chapel Hill, NC (US); Deborah Myers, Hilliard, OH (US)

(73) Assignee: JPMORGAN CHASE BANK, N.A., New York, NY (US)

(*) Notice: Subject to any disclaimer, the term of this patent is extended or adjusted under 35 U.S.C. 154(b) by 190 days.

This patent is subject to a terminal disclaimer.

(21) Appl. No.: 16/361,547

(22) Filed: Mar. 22, 2019

(65) Prior Publication Data

US 2019/0279175 A1   Sep. 12, 2019

Related U.S. Application Data

(60) Division of application No. 14/106,999, filed on Dec. 16, 2013, now Pat. No. 10,282,712, which is a
(Continued)

(51) Int. Cl.
*G06Q 20/10* (2012.01)
*G06Q 20/32* (2012.01)
(Continued)

(52) U.S. Cl.
CPC .......... *G06Q 20/10* (2013.01); *G06Q 20/108* (2013.01); *G06Q 20/3265* (2020.05);
(Continued)

(58) Field of Classification Search
CPC ....... G06Q 20/10; G06Q 20/108; G06Q 20/32
(Continued)

(56) References Cited

U.S. PATENT DOCUMENTS

| 4,375,032 A | 2/1983 | Uchida et al. |
| 4,423,313 A | 12/1983 | Tanigaki et al. |

(Continued)

FOREIGN PATENT DOCUMENTS

| CA | 2275211 | 6/1998 |
| EP | 0825544 | 2/1998 |

(Continued)

OTHER PUBLICATIONS

Anyasi F.I., Otubu, P.A., Mobile Phone Technology in Banking System: Its Economic Effect, Research Journal of Information Technology, Aug. 29, 2009, 1-5 (Year: 2009).*
(Continued)

*Primary Examiner* — Daniel S Felten
*Assistant Examiner* — Kevin T Poe
(74) *Attorney, Agent, or Firm* — GREENBLUM & BERNSTEIN, P.L.C.

(57) ABSTRACT

A system and method are provided for managing electronic disbursements transferred from a business client of a financial institution to customers of the business client. The system includes a disbursement instruction processor receiving a disbursement instruction over a network from a business client system, the disbursement instruction processor processing the instruction and performing multiple steps. The steps include using a customer identifier to determine available payment channels for the customer and selecting an electronic payment channel when available payment channels include an electronic payment channel. An electronic disbursement notification is forwarded to the cus-
(Continued)

tomer. A confirmation may be provided upon acceptance of the disbursement through the disbursement notification.

15 Claims, 16 Drawing Sheets

Related U.S. Application Data continuation-in-part of application No. 13/773,855, filed on Feb. 22, 2013, now Pat. No. 10,387,858.

(60) Provisional application No. 61/762,077, filed on Feb. 7, 2013.

(51) Int. Cl.
*G06Q 30/04* (2012.01)
*G06Q 40/12* (2023.01)

(52) U.S. Cl.
CPC ............ *G06Q 30/04* (2013.01); *G06Q 40/12* (2013.12); *G06Q 40/128* (2013.12)

(58) Field of Classification Search
USPC ........................................................ 705/39
See application file for complete search history.

(56) References Cited

U.S. PATENT DOCUMENTS

| | | | |
|---|---|---|---|
| 4,423,318 A | 12/1983 | Gotou et al. | |
| 4,587,379 A | 5/1986 | Masuda et al. | |
| 4,594,663 A | 6/1986 | Nagata et al. | |
| 4,713,761 A | 12/1987 | Sharpe et al. | |
| RE32,985 E | 7/1989 | Nagata et al. | |
| 4,877,947 A | 10/1989 | Mori et al. | |
| 5,220,501 A | 6/1993 | Lawlor et al. | |
| 5,465,206 A | 11/1995 | Hilt et al. | |
| 5,604,802 A | 2/1997 | Holloway et al. | |
| 5,655,089 A | 8/1997 | Bucci | |
| 5,669,528 A | 9/1997 | Romero et al. | |
| 5,699,528 A | 12/1997 | Hogan | |
| 5,809,483 A | 9/1998 | Broka et al. | |
| 5,832,460 A | 11/1998 | Bednar et al. | |
| 5,903,881 A | 5/1999 | Schrader et al. | |
| 5,930,773 A | 7/1999 | Crooks et al. | |
| 5,943,656 A | 8/1999 | Crooks et al. | |
| 5,963,925 A | 10/1999 | Kolling et al. | |
| 6,039,245 A | 3/2000 | Symonds et al. | |
| 6,052,671 A | 4/2000 | Crooks et al. | |
| 6,070,150 A | 5/2000 | Remington et al. | |
| 6,078,891 A | 6/2000 | Riordan et al. | |
| 6,078,907 A | 6/2000 | Lamm | |
| 6,128,603 A | 10/2000 | Dent et al. | |
| 6,292,789 B1 | 9/2001 | Schutzer | |
| 6,374,229 B1 | 4/2002 | Lowrey | |
| 6,385,595 B1 | 5/2002 | Kolling et al. | |
| 6,493,685 B1 | 12/2002 | Ensel et al. | |
| 6,505,173 B1 | 1/2003 | Weibel et al. | |
| 6,578,015 B1 | 6/2003 | Haseltine et al. | |
| 6,606,606 B2 | 8/2003 | Starr | |
| 6,609,113 B1 | 8/2003 | O'Leary et al. | |
| 6,678,664 B1 | 1/2004 | Ganesan | |
| 6,832,212 B1 | 12/2004 | Zenner et al. | |
| 6,880,079 B2 | 4/2005 | Kefford et al. | |
| 7,031,939 B1 | 4/2006 | Gallagher | |
| 7,516,101 B2 | 4/2009 | Remington et al. | |
| 7,523,057 B1 | 4/2009 | Cornelius | |
| 7,685,006 B2 | 3/2010 | Rahn et al. | |
| 7,792,749 B2 | 9/2010 | Ganesan | |
| 8,190,504 B1 | 5/2012 | Stolz et al. | |
| 8,275,702 B1 | 9/2012 | Enriquez | |
| 8,290,865 B2 | 10/2012 | Lawrence et al. | |
| 8,326,754 B2 | 12/2012 | Bandych et al. | |
| 8,352,365 B1 | 1/2013 | Goldberg et al. | |
| 8,401,892 B2 | 3/2013 | Stone et al. | |
| 8,550,903 B2* | 10/2013 | Lyons | G06K 5/00 463/40 |
| 9,646,450 B2* | 5/2017 | Melik-Aslanian | G06Q 40/03 |
| 2002/0019808 A1 | 2/2002 | Sharma | |
| 2002/0065772 A1 | 5/2002 | Saliba et al. | |
| 2002/0169719 A1 | 11/2002 | Dively et al. | |
| 2002/0169983 A1 | 11/2002 | Rygaard | |
| 2003/0023492 A1 | 1/2003 | Riordan et al. | |
| 2003/0088460 A1 | 5/2003 | Riordan et al. | |
| 2004/0019553 A1 | 1/2004 | Setz et al. | |
| 2004/0035923 A1 | 2/2004 | Kahr | |
| 2004/0054685 A1 | 3/2004 | Rahn et al. | |
| 2004/0148252 A1 | 7/2004 | Fleishman | |
| 2005/0049893 A1 | 3/2005 | Tien | |
| 2005/0161502 A1 | 7/2005 | Smith et al. | |
| 2005/0177470 A1 | 8/2005 | Tandon et al. | |
| 2005/0222952 A1 | 10/2005 | Garrett | |
| 2006/0036526 A1 | 2/2006 | Ramos et al. | |
| 2007/0038564 A1 | 2/2007 | Leavitt et al. | |
| 2007/0080207 A1* | 4/2007 | Williams | G06Q 40/02 235/379 |
| 2007/0101413 A1* | 5/2007 | Vishik | H04L 67/306 726/5 |
| 2007/0106617 A1* | 5/2007 | Mabray | G06Q 30/06 705/59 |
| 2007/0112629 A1 | 5/2007 | Solomon et al. | |
| 2008/0021822 A1 | 1/2008 | Hinton et al. | |
| 2008/0162349 A1 | 7/2008 | Pratt et al. | |
| 2008/0179386 A1* | 7/2008 | Oberan | B42D 1/005 235/375 |
| 2009/0048972 A1* | 2/2009 | Bierer | G06Q 40/02 235/487 |
| 2009/0099914 A1* | 4/2009 | Lang | G06Q 30/06 705/26.1 |
| 2009/0164329 A1 | 6/2009 | Bishop et al. | |
| 2009/0182586 A1 | 7/2009 | Cohane | |
| 2009/0210339 A1* | 8/2009 | Bhagwat | G06Q 40/00 705/38 |
| 2010/0223160 A1 | 9/2010 | Brown | |
| 2010/0235283 A1* | 9/2010 | Gerson | G06Q 20/401 379/88.16 |
| 2011/0093382 A1 | 4/2011 | Coltrell | |
| 2011/0119366 A1 | 5/2011 | Elman et al. | |
| 2011/0131096 A1 | 6/2011 | Frew et al. | |
| 2011/0191149 A1* | 8/2011 | Blackhurst | G06Q 30/0207 705/14.1 |
| 2011/0238553 A1 | 9/2011 | Raj et al. | |
| 2011/0276418 A1* | 11/2011 | Velani | G06Q 20/3276 705/16 |
| 2012/0084178 A1 | 4/2012 | Ehbauer et al. | |
| 2012/0197795 A1* | 8/2012 | Campbell | G06Q 30/04 705/42 |
| 2012/0203664 A1* | 8/2012 | Torossian | G06Q 20/3224 705/26.41 |
| 2013/0013472 A1 | 1/2013 | Votaw et al. | |
| 2013/0030962 A1 | 1/2013 | Erle et al. | |
| 2013/0046608 A1 | 2/2013 | Coppinger | |
| 2013/0090980 A1 | 4/2013 | Hummel | |
| 2013/0238492 A1 | 9/2013 | Muthu | |
| 2014/0040100 A1 | 2/2014 | Keitz | |
| 2014/0040159 A1 | 2/2014 | Caron et al. | |
| 2014/0074705 A1 | 3/2014 | Kimberg et al. | |
| 2014/0108236 A1 | 4/2014 | Purves | |
| 2017/0278099 A1* | 9/2017 | Curry | G06Q 20/4012 |
| 2019/0147505 A1* | 5/2019 | Blass | G06Q 20/10 705/36 R |

FOREIGN PATENT DOCUMENTS

| | | |
|---|---|---|
| EP | 1016047 A2 | 7/2000 |
| EP | 1049056 A2 | 11/2000 |
| EP | 1052603 A2 | 11/2000 |
| EP | 1087349 A2 | 3/2001 |
| EP | 1091330 A2 | 4/2001 |
| EP | 1122676 A1 | 8/2001 |
| EP | 1291794 A1 | 3/2003 |
| EP | 1338998 A2 | 8/2003 |
| EP | 2028614 A2 | 2/2009 |

(56) References Cited

FOREIGN PATENT DOCUMENTS

| | | |
|---|---|---|
| WO | WO-1999005628 A1 | 2/1999 |
| WO | WO-1999013421 A2 | 3/1999 |
| WO | WO-1999015999 A1 | 4/1999 |
| WO | WO-2000058876 A1 | 10/2000 |
| WO | WO-2001025997 | 4/2001 |
| WO | WO-2001041020 | 6/2001 |
| WO | WO-2001052142 A2 | 7/2001 |
| WO | WO-2001057745 A2 | 8/2001 |
| WO | WO-2001057753 A1 | 8/2001 |
| WO | WO-2001080102 A1 | 10/2001 |
| WO | WO-2001091066 A2 | 11/2001 |

OTHER PUBLICATIONS

Karnouskos S, Arimura T, Yokoyama S, Csik B, "Instant Messaging Enabled Mobile Payments", Emerging Wireless Multimedia Services and Technologies, 2005 (Year: 2005).*

Al-Fairuz Mohamed, Renaud Karen, Multi-channel, Multi-level Authentication for More Secure eBanking, semanticscholar.org, 2010 (Year: 2010).*

PCT International Search Report mailed Jun. 23, 2015.

PCT International Search Report mailed Jul. 8, 2014.

\* cited by examiner

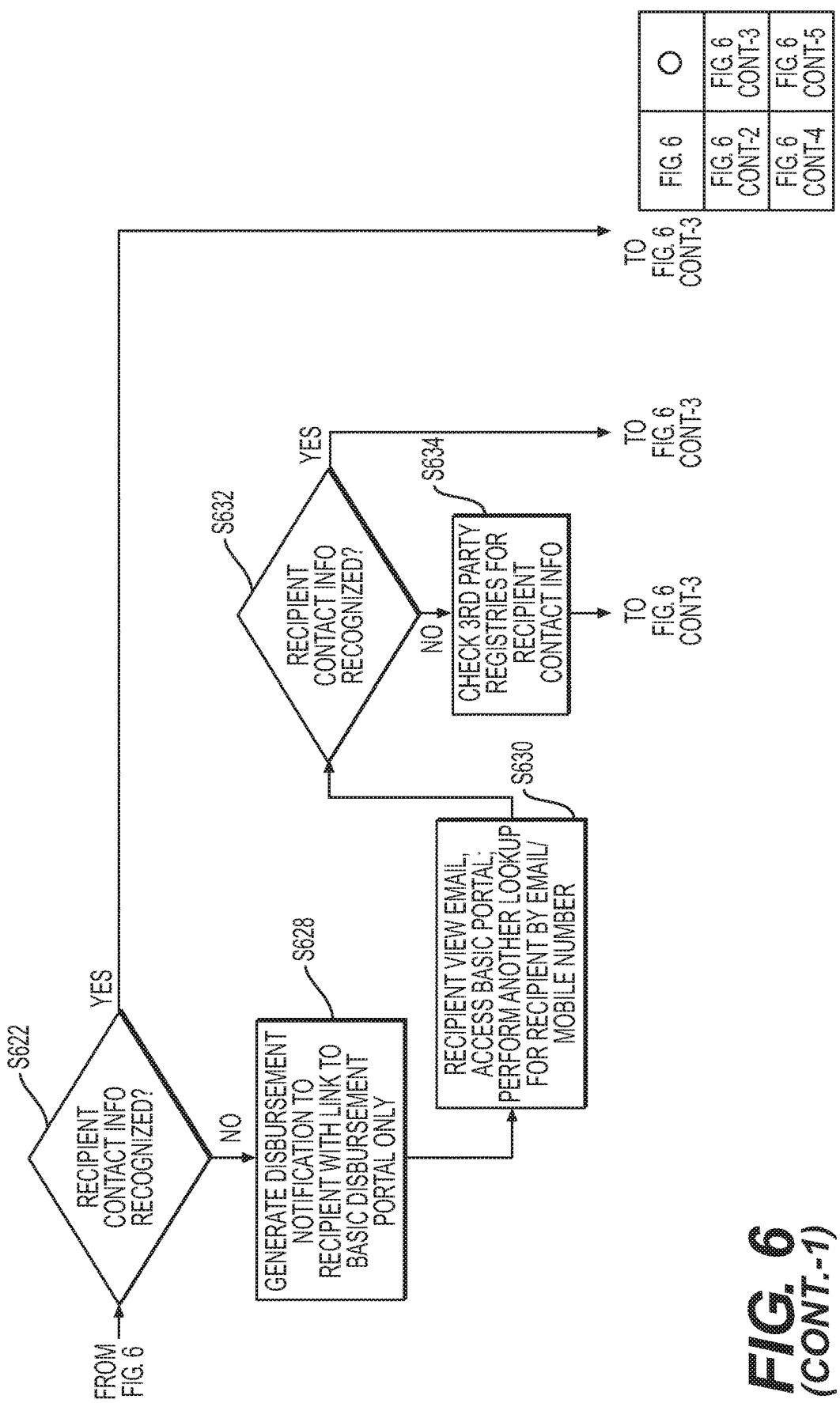
FIG. 6 (CONT.-1)

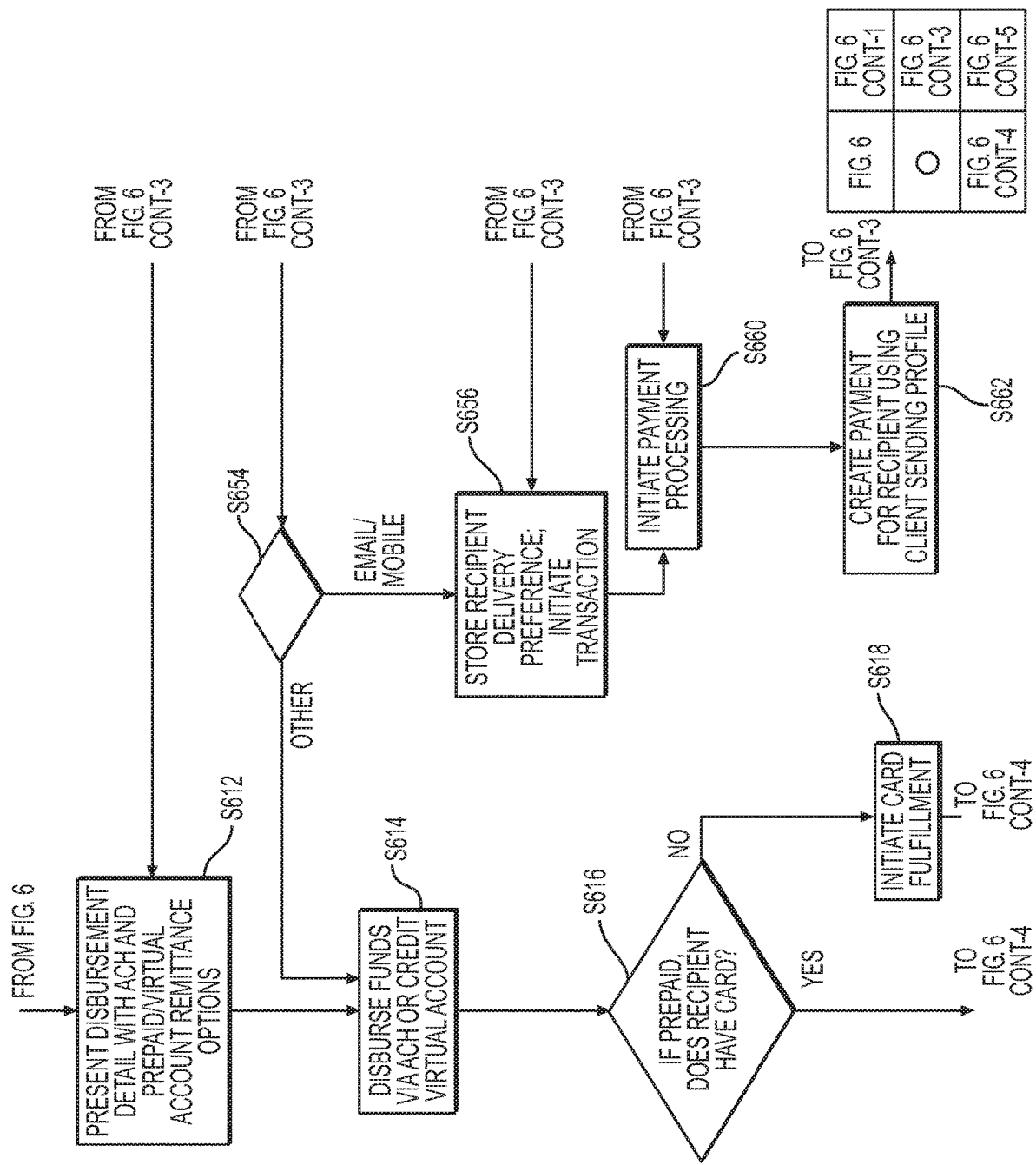

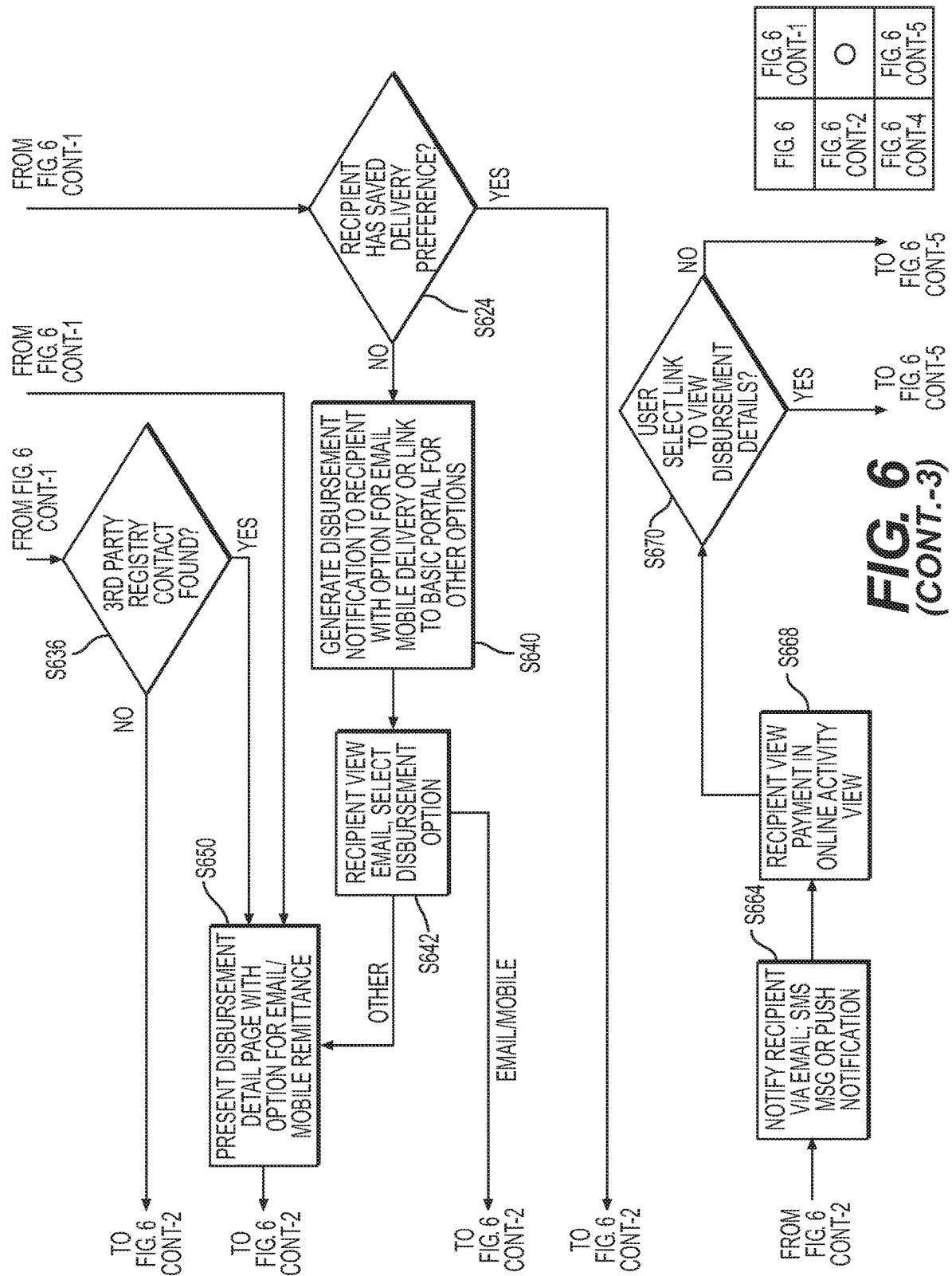
FIG. 6 (CONT.-3)

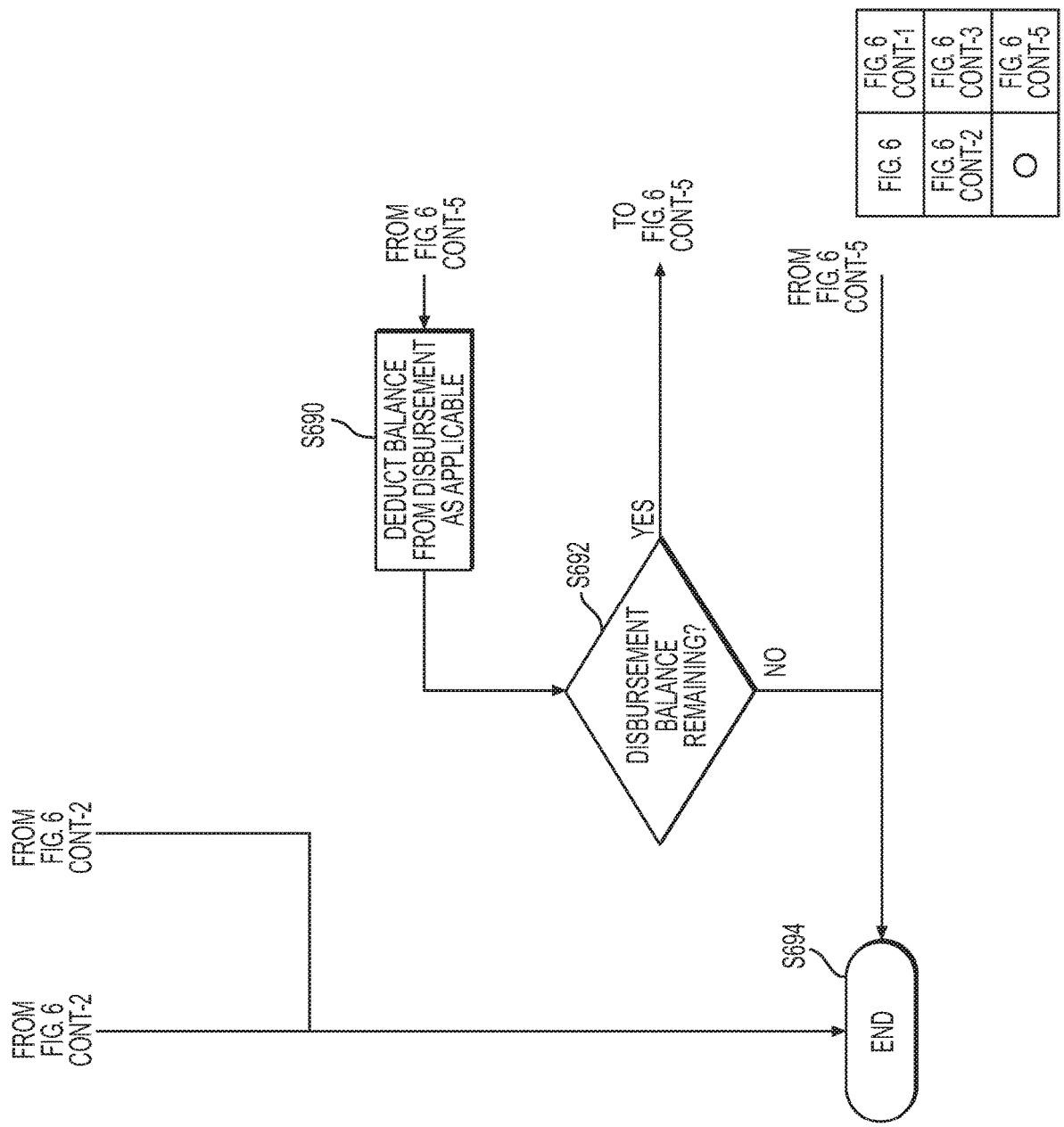
FIG. 6 (CONT.-4)

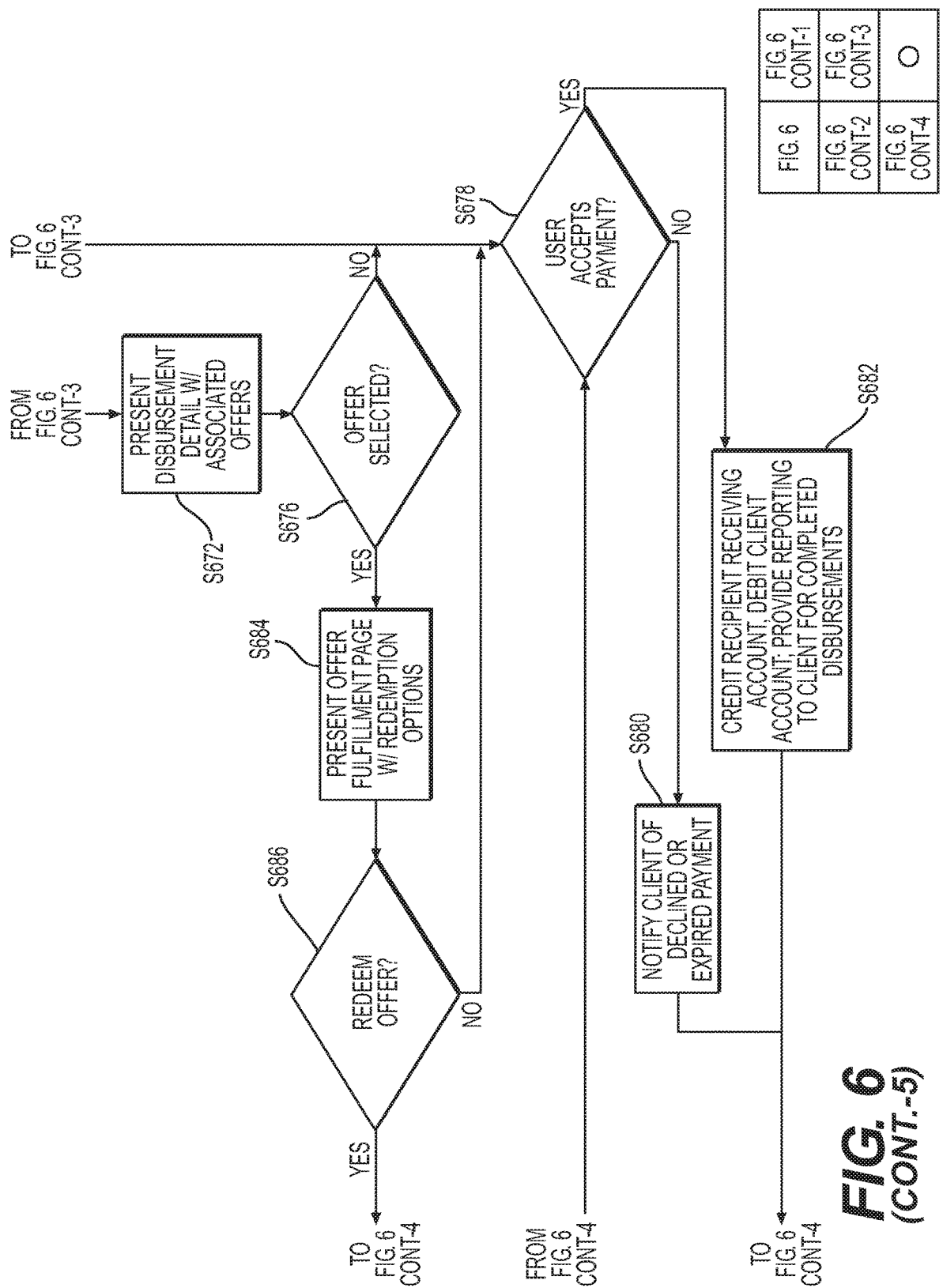

INTEGRATED ELECTRONIC DISBURSEMENT AND CASH FLOW MANAGEMENT SYSTEM AND METHOD

RELATED APPLICATIONS

This application is a divisional application of U.S. application Ser. No. 14/106,999 filed Dec. 16, 2013, which is a continuation-in-part application of U.S. application Ser. No. 13/773,855 filed Feb. 22, 2013, which claims priority to U.S. Provisional Application No. 61/762,077 filed on Feb. 7, 2013, each of which is hereby incorporated by reference herein in its entirety. This application is related to U.S. Pat. No. 7,949,579 and U.S. patent application Ser. No. 60/215,003 and Ser. No. 13/735,090, which are hereby incorporated by reference in their entirety.

TECHNICAL FIELD

Embodiments of the invention are related generally to systems and methods for managing electronic disbursements within an integrated cash flow management system.

BACKGROUND OF THE INVENTION

Over the past several years, businesses have begun to realize the reduced costs and fees associated with electronic disbursements. When processing refunds, rebates, rewards, or otherwise refunding money to customers, businesses have come to appreciate the simplicity and cost effectiveness of electronic processing. Paper checks can be expensive both to issue and ultimately to reconcile. Furthermore, various e-commerce or e-business solutions have become available that allow individuals and businesses to perform financial transactions over the Internet through a secure website. This type of service enables customers to do their banking or financial transaction processing from anywhere where Internet access is available. In many cases, a web browser is utilized and any normal Internet connection is suitable. Thus, online financial transactions have become commonplace.

However, problems exist with current systems. When receiving refunds or other disbursements customers are often required to contact the business making the disbursements, by phone in order to receive the disbursement. Furthermore, customers typically do not have a choice in how the disbursement is received. The business will often make the disbursement by issuing a paper check.

From the perspective of businesses, the limited availability of customer information prevents businesses from ascertaining how customers would like to receive disbursements or how customers are able to receive disbursements. Businesses may not have access to bank account or credit card information that would be required to automatically disburse funds electronically. Accordingly, the lack of centralization and information remains a problem for both businesses and customers. Customers often cannot receive disbursements through their preferred method and businesses are often unable to determine a preferred disbursement method for each customer.

Third party aggregators have evolved to consolidate payment services. However, even if customers and businesses are able to transfer funds through a third party aggregator, these funds are not linked to financial information, which is typically only available through a financial institution. Thus, bill payment and disbursements are not visually linked to accounts or to any type of accounting system. Therefore, in order to get a larger financial picture, both businesses and customers must access disparate systems and review the information available from all of these systems.

For business owners, the payables and receivables environment is typically fragmented and includes multiple tools and programs that focus on only individual components of cash flow. These disjointed payables and receivable processes can have a negative impact on cash flow due to the incomplete overview available to business owners. Typically, business owners are required to rekey data in order to manually reconcile disbursements. Furthermore, business owners may be required to rekey data and manually manage disbursements and reimbursements to employees. Additionally, businesses may not have one consolidated view of their cash flow and may be required to visit multiple sources in order to assess cash flow status.

Accordingly, a solution is needed that provides financial institution clients, particularly organizational entities such as large corporations, government entities, small businesses, non-profit entities etc. (hereinafter referenced as "business clients") with a solution that integrates disbursements into accounting and financial management software. The solution may be operable to show a complete cash flow picture by creating an experience that manages movement of money from start to finish and offers business owners real time transparency. To further enhance convenience, customers and businesses both want to handle cash flow while in transit. Therefore, a need exists and a solution is needed for convenient mobile interfaces for generating and accepting disbursements.

SUMMARY OF THE INVENTION

In one aspect, the invention includes a method for managing electronic disbursements transferred from a business client of a financial institution to customers of the business client. The method includes receiving a disbursement instruction from a business client system over a network. A disbursement instruction processor performs steps including analyzing the instruction to extract customer identification information, using the customer identification information to determine available payment channels for the customer, and selecting an electronic channel when the available payment channels include an electronic payment channel. The method additionally includes disbursing the payment in accordance with the disbursement instruction using the selected channel, sending an electronic notification to the customer of the disbursement, monitoring acceptance of the disbursement by the customer, and notifying the business client when the disbursement expires without acceptance by the customer.

In an additional aspect, the invention includes a system for managing electronic disbursements transferred from a business client of a financial institution to customers of the business client. The system includes a disbursement instruction processor receiving a disbursement instruction over a network from a business client system. The disbursement instruction processor processes the instruction by analyzing the instruction to extract customer identification information, using the customer identification information to determine available payment channels for the customer, and selecting an electronic payment channel when the available payment channels include an electronic payment channel. The system additionally includes a client payment manager for disbursing the payment in accordance with the disbursement instruction using the selected payment channel and sending an electronic notification to the customer of the disbursement and a disbursement status monitor for monitoring acceptance of the disbursement and for notifying the business client when the disbursement expires without acceptance.

In yet an additional aspect, a system is provided for managing electronic disbursements transferred from a business client of a financial institution to customers of the business client. The system includes a disbursement instruction processor receiving a disbursement instruction over a network from a business client system. The disbursement instruction processor uses a customer identifier to determine available payment channels for the customer and selects an electronic payment channel when available payment channels include an electronic payment channel. The system additionally includes an offer generator for selecting at least one offer based on the disbursement instruction and a client payment manager for disbursing the payment in accordance with the disbursement instruction using the selected payment channel and sending an electronic disbursement notification to the customer, the notification including access to the selected offer.

In yet a further aspect of the invention, a method is provided for managing transfer of electronic disbursements from a business client of a financial institution to customers of the business client. The method includes receiving at a disbursement instruction processor, a disbursement instruction over a network from a business client system, the disbursement instruction processor processing the instruction to use a customer identifier to determine available payment channels for the customer and select an electronic payment channel when available payment channels include an electronic payment channel. The method additionally includes extracting information from the disbursement instruction using an offer generator, the information including customer data and client data, the offer generator accessing an offer database and selecting at least one offer based on the extracted information and correlating the offer with the disbursement. The method further includes distributing the disbursement using the selected payment channel and sending an electronic notification of the disbursement to the customer, the notification including access to the selected offer.

BRIEF DESCRIPTION OF THE DRAWINGS

The present invention is described in detail below with reference to the attached drawings figures, wherein.

DETAILED DESCRIPTION OF PREFERRED EMBODIMENTS

Embodiments of the present invention are directed to a system and method for providing financial institution clients, particularly businesses, which may include large corporate clients, small businesses, governmental entities, non-profit entities, etc. with a cash flow management solution that allows for a cost effective and efficient method of distributing and reconciling disbursements and integrating disbursement data into accounting and financial management software. Embodiments of the invention allow the business clients to distribute disbursements to customers without possessing any financial account information from the customers. Systems and methods of the invention leverage the data available to the entity hosting the system, which may be a financial institution, to facilitate the disbursement process.

Embodiments of the system have an open architecture that facilitates integration with enterprise resource platforms and external software providers including invoicing and accounting software, such as Quickbooks™, to create an integrated product suite. Thus, in embodiments of the invention, if a business client issues a disbursement notification, any redemption of the disbursement will be automatically identified and reconciled. Accordingly, embodiments of the invention offer a consistent experience across devices and channels. The disbursement system and method disclosed herein may facilitate multiple types of disbursements, including, but not limited to, payments to contractors, payroll, compensatory reimbursements, insurance disbursements, rebates, and refunds.

Figure 1:
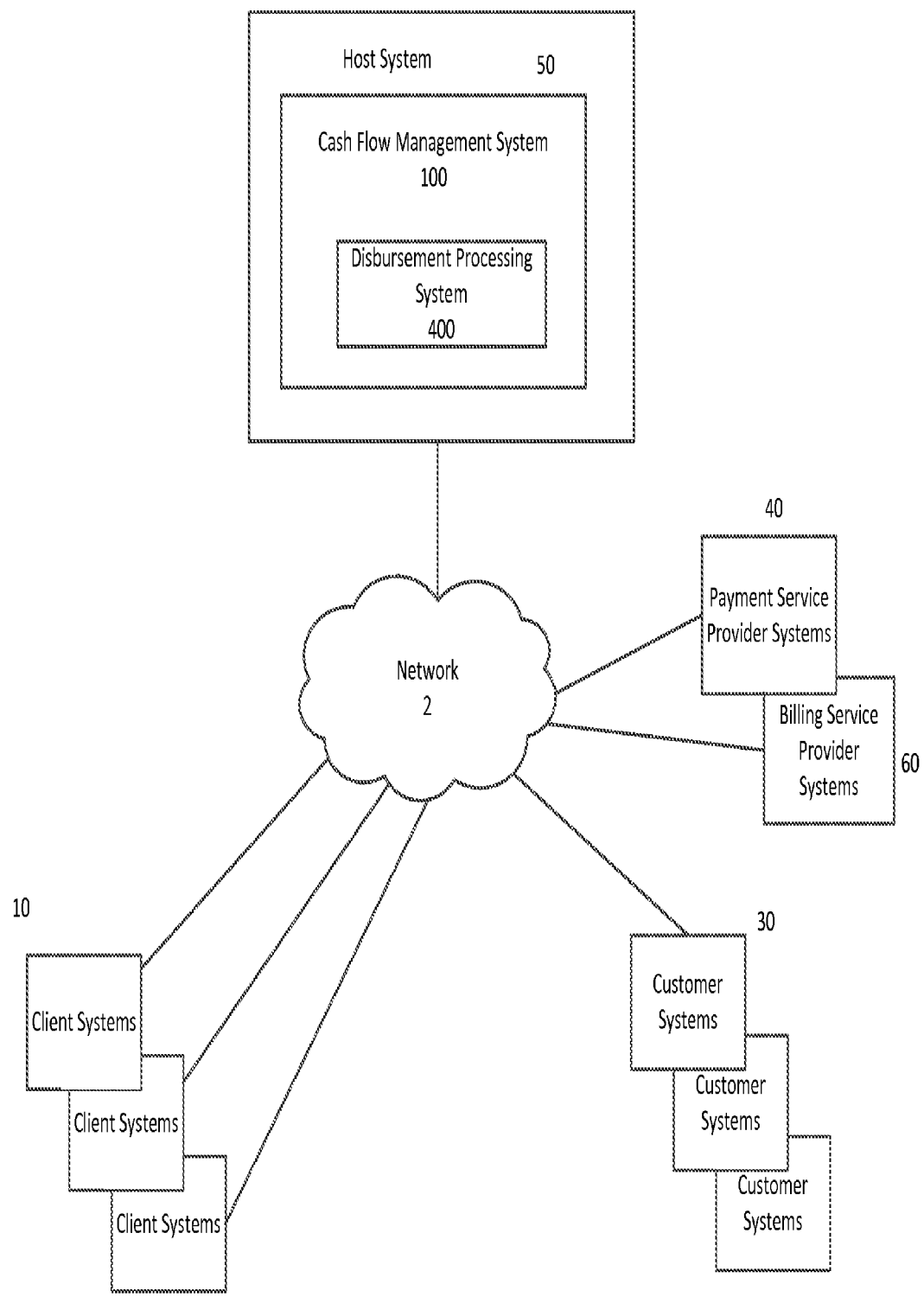
FIG. 1 is a block diagram illustrating an operating environment for a disbursement processing system in accordance with an embodiment of the invention.

FIG. 1 is a block diagram illustrating an operating environment for a cash flow management 100 system in accordance with an embodiment of the invention. A host system 50 includes the cash flow management system 100. The cash flow management system 100 includes a disbursement processing system 400. These systems are connected over a network 2 with other systems including client systems 10, customer systems 30, payment service providers 40, and billing service providers 60. Other external systems may also be connected.

The host system 50 may be or include a host platform at a financial services firm or financial institution. Accordingly, the host system 50 may include many financial management systems that are not shown. For example, the host system 50 may include account processing systems, credit card processing systems, and other known financial systems. Furthermore, the host system 50 is able to store and access account information in order to facilitate disbursement distribution. The host system 50 preferably provides a website for customers and through this website, business clients may leverage the cash flow management system 100 disclosed herein and customers may access electronic bill payment functions also described herein.

The cash flow management system 100 provides a financial management framework. As will be further set forth below, the cash flow management system 100 simplifies cash flow management for business owners and allows convenient visualization of cash flow for businesses.

The disbursement processing system 400 operating within the cash flow management system 100 may be provided to manage disbursements from the business client systems 10 to the customer systems 30. The disbursement processing system 400 is described in greater detail with reference to the additional FIGS.

The network 2 is preferably the Internet, but may be or include other types of networks. Furthermore, even though only one network is shown, multiple networks may be used. For example, payment service provider systems 40 may communicate over a different network with the cash flow management system 100 and payer systems 30. The network 2 may include a wired or wireless local area network (LAN) and a wide area network (WAN), wireless personal area network (PAN) and other types of networks. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

The client systems 10 may include computing systems adapted for business use. From the client systems 10, business clients (which may include large corporations, small businesses, non-profits, sole proprietorships, governmental entities, etc.) are able to utilize disbursement functionality available through the disbursement processing system 400 to enable execution of disbursements from notification to fulfillment. Thus the client systems 10 may include at least one processor and multiple applications executed on the processor capable of performing accounting functions, invoicing functions, and other financial processing functions. The client systems 10 may include a browser for accessing financial software applications provided by the host system 50 or other connected systems that offer such functionality over the Internet or any other network. The client systems 10 may additionally be or include mobile systems, such as smart phones, tablets, or other portable computing apparatus. Mobile client systems may execute downloadable applications for operating in conjunction with the cash flow management system 100. The downloadable applications may be stored in memory and executed by processors on the mobile systems and may provide a plurality of user interfaces. The downloadable applications may include, for example, applications that when executed, facilitate disbursement distribution. The applications may also facilitate receipt capture or invoice capture using integral features.

The customer systems 30 may also include any types of computing systems including desktop or laptop computers or mobile devices. Customers may be individuals, families, businesses, or other entities. From the customer systems 30, customers may receive notification of available disbursements and have the ability to accept or decline receipt of the disbursements. These customer systems 30 may also be equipped with image capture equipment for capturing images of the customer or of receipts or invoices for later use. The customer systems 30 may include a browser capable of accessing online bill payment systems and other financial management systems. The customer systems 30 may also be or include mobile systems including any handheld mobile devices with internet access such as iPhones™ or other mobile, phones, tablets, or any other known devices. The mobile customer devices may execute downloadable applications for operating in conjunction with the cash flow management system 100. The downloadable applications may be stored in memory and executed by processors on the mobile systems and may provide a plurality of user interfaces.

Disbursements may be made using one of multiple payment channels offered by payment service providers 40 or through the host system 50. However, in embodiments of the invention, the disbursements are made through electronic payment channels, preferably offered by the host system. Such payment channels are not only efficient, but also inexpensive, as interchange fees may, in some instances, be avoided. Examples of electronic payment providers include independent providers, such as PayPal®, mobile phone providers, groups of financial institutions, with collaborative payment channels, and individual banks, providing systems such as QuickPay®, offered by JPMorgan Chase®. Financial institutions may execute these payments free of charge for approved individuals, such as banking customers. Using this option, payers who hold accounts with the financial institution may respond to a push notification from a mobile application to accept or decline a disbursement. In embodiments of the invention, these actions may be executed without the need for customer login. In embodiments of the invention, similar functionality through the mobile application may be available to customers who do not hold accounts with the financial institution.

Additionally or alternatively to the delivery of disbursement notification through electronic payment channels, the host system 50 may communicate through push notifications that may be conveyed through mobile or desktop applications and/or SMS notifications. Furthermore, in addition to providing a link to view disbursement details, the email, text, or other form of push notification may allow the disbursement to be received and appropriately directed without requiring login credentials or other actions from the recipient. The push notification may allow the disbursement to be accepted with one click or tap on the notification or in the case of SMS messages, with a return text. The return text message may, for example, simply convey the message "ACCEPT" or "DECLINE" an alternative message.

The payment service provider systems 40 may be operated by payment service providers (PSPs) that offer businesses online services for accepting electronic payments by a variety of payment methods including credit card, bank-based payments such as direct debit, bank transfer, and real-time bank transfer based on online banking. Some PSPs provide services to process other next generation methods (Payment systems) including cash payments, wallets such as PayPal®, Adyen™, and WebMoney™, prepaid cards or vouchers, and even paper or e-check processing. In some embodiments, electronic payments of vouchers may be implemented as scannable barcodes, such as a QR code, a UPC barcode, a matrix barcode, or similar type of code.

For example, an airline reimbursing customers for an overbooked flight with travel vouchers may disburse a voucher by transmitting a QR code to the traveler's mobile device. An airline may announce that a flight is overbooked, and is willing to offer travelers a travel voucher in exchange for rescheduling for a later flight. Travelers with flexible travel plans typically approach the ticket counter and present their paper airline ticket (travelers who store their travel tickets on their mobile device or smartphone may present their mobile device displaying an electronic ticket), in exchange for a voucher. In embodiments of the invention, after a traveler presents their ticket to the ticket counter, the airline personnel may then send a voucher in the form of a scannable barcode to the traveler. The airline may send the voucher using any one of the electronic channels discussed above, such as for example, by e-mail. In other embodiments, the airline may send the barcode to the traveler's smartphone or mobile device. The traveler may then present the barcode at a cooperating merchant for redemption, in the same manner as the traveler would redeem a paper voucher. In other embodiments of the invention, a traveler may receive an alert or notification of the voucher offer on a mobile application running on their mobile device or smartphone. Upon receipt of the alert or barcode, the mobile application may also present the details of the terms and conditions of the voucher. As described above, the mobile application may provide a user interface that includes buttons for the traveler to accept or decline the voucher.

One advantage of representing vouchers as scannable barcodes, is the ability to track the use and/or transfer of vouchers after their redemption, as discussed in more detail below. As discussed below, information about the use of the barcode, such as when, where, or who it was redeemed by, allows the disbursement processing system to detect suspicious activity.

Typically, a PSP can connect to multiple acquiring banks, card, and payment networks. In many cases, the PSP will fully manage these technical connections, relationships with the external network, and bank accounts. The billing service providers (BSPs) 60 may be or include be third party aggregators, which collect bills from multiple businesses for display to payers. They can also create biller direct sites, where customers can view and pay their bills at the biller's website.

Figure 2:
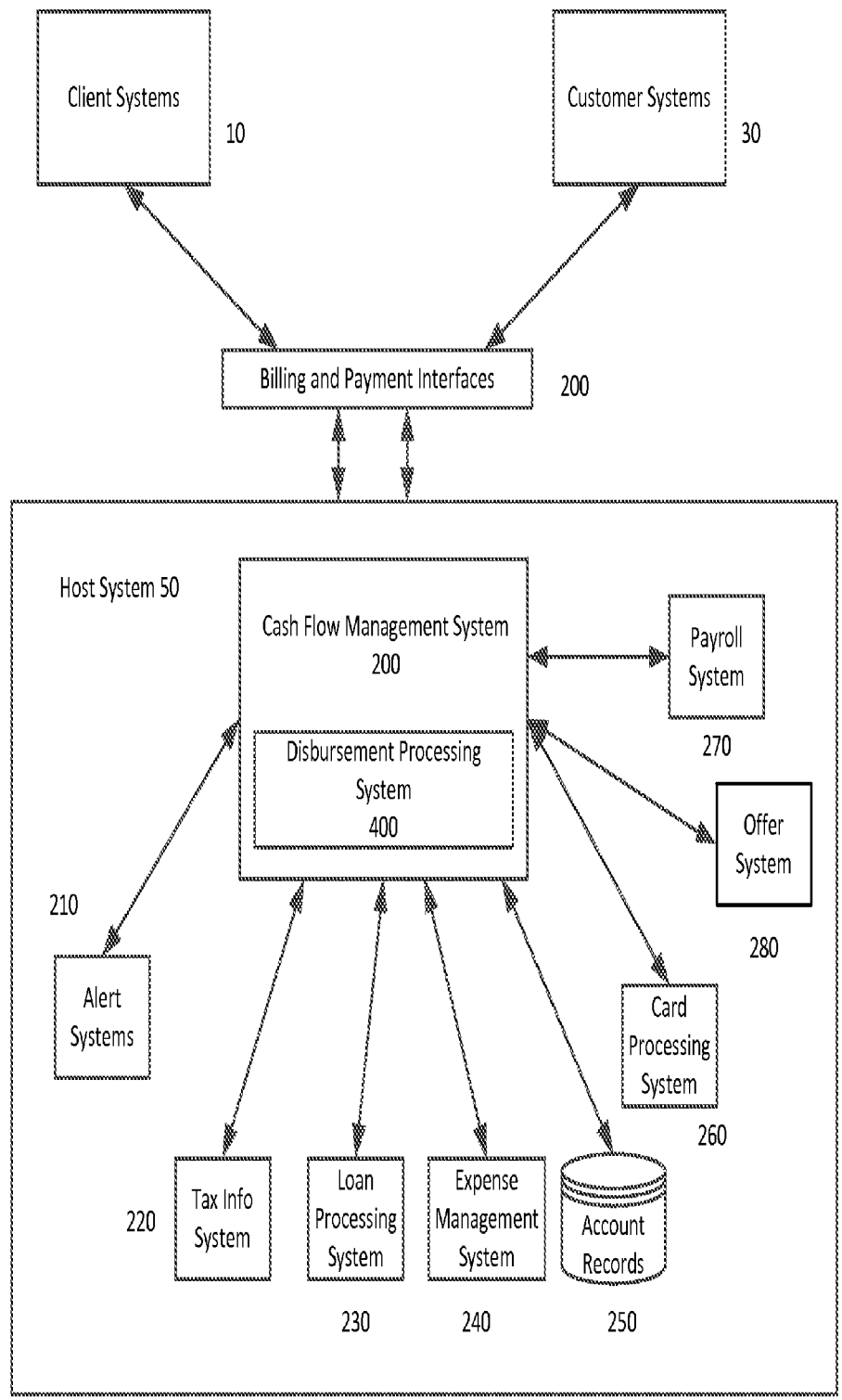
FIG. 2 is a block diagram illustrating a cash flow management transaction flow that may be incorporated in embodiments of the invention.

FIG. 2 is a block diagram illustrating interaction between the host system 50, the business client systems 10, and the customer systems 30 in accordance with embodiments of the invention. The host system 50 may accept payments from and disburse payments to customer systems 30, but may also interact with other billing and payment interfaces, such as payment service providers and systems in order to collect payment information. The host system 50 may include the cash flow management system 100, which interacts with other components of the host system 50 as well as software applications, such as accounting applications that may be accessed, either within the host system 50 or externally, by the business client computing systems 10 and the customer computing systems 30. As illustrated, the host system 50 may host multiple financial solutions, such as alert systems 210, tax system 220, loan processing system 230, expense management system 240, card processing system 260, payroll system 270, and offer system 280. Other systems may also be included. The host system 50 also houses or accesses account records 250 and additional data relevant to billers and payers.

The alert systems 210 may be connected with client accounts within the financial institution host in order to generate alerts regarding credit card charges, account balances, or account activity generally. Events generating alerts may be defined by the host system 50 or by account holders. Alert systems 210 may be configured to generate alerts to clients and/or customers whenever a disbursement is issued, accepted, declined, or expired.

The tax information system 220 may be available to client systems with information regarding collected taxes or paid taxes. For example, the tax information system 220 may record the portion of receivables attributed to tax for a client system and make recommendations to reserve the money for taxes or may in some embodiments arrange for the tax to be paid directly. In embodiments of the invention, the cash flow management system 100 may operate in cooperation with the tax information system to track the tax portion for the business client, arrange for extended storage of tax-related documents, and create buckets to hold tax collected in a different bucket than revenue. In embodiments of the invention, tax collected would not be available to business clients for uses other than tax payment unless they manage their controls to make the funds available. Furthermore, the cash flow management system 100 may allow businesses to control access to tax information such that financial professionals, such as CPAs, can access the business's tax information online.

Additionally, in embodiments of the invention, the disbursement processing system disclosed herein may utilize the tax information system 220 to offer a disbursement platform for state and federal governmental entities. For example, rather than requiring customers to submit account information directly to the governmental entities, the host system would access stored account information and search customer preferences and follow disbursement instructions for tax refunds generated by the governmental entities.

In other embodiments of the invention, the disbursement processing system disclosed herein may allow customers to electronically file tax returns with state and federal governmental entities utilizing the tax information system 220. The state and federal governmental entities may then disburse tax refunds to the customer through the disbursement platform. According to some embodiments, the disbursement platform may track the tax refunds and automatically match a proportionate amount of the disbursement to the tax filer.

The loan processing system 230 may receive and process loan applications and may further generate loan information for offers or in response to inquiries. The loan processing system 230 may also process loan payments and generate statements. In embodiments of the invention, and as will be further described below, the cash flow management system 100 may operate in cooperation with the loan processing system 230 in order to create a short term lending product based on known receivables. The cash flow management system 100 may display an offer for the short term lending product when analysis of business receivables indicates that the product is appropriate.

The expense management system 240 may be or include a system similar to that described in U.S. Pat. No. 7,949,579, which has been incorporated by reference. The expense management system 240 may be substantially as described in U.S. Pat. No. 7,949,579 and may be implemented in combination with embodiments of the invention. The expense management system 240 allows clients and customers to view captured data and allocate transactions or percentages of transactions to user-defined categories. The expense management system 240 receives images of receipts from purchasers or receives data from merchants detailing line item data from purchases. Once this information is in the expense management system, the system allows users to categorize the information by project or to otherwise manipulate the information to manage expenses in any convenient manner. In cooperation with the expense management system 240, embodiments of the invention enable the linking of expenses to new or existing invoices. This feature may be particularly useful when billers are working on a time and materials basis and are able to tie materials and related expenditures to a particular bill that will be transmitted to a payer. Furthermore, the expense management system 240 may also monitor employee-submitted expenses. Thus, through the disbursement processing system disclosed herein, disbursements to employees may be made electronically without the employee providing account information directly to the employer.

The card processing system 260 may include a system such as those known in the art for monitoring and processing payment card transactions. Payment cards may include, for example, credit cards, debit cards, smart cards, prepaid cards, etc. The card processing system 260 may communicate with other disclosed systems such as the alerts system 210 in order to generate alerts and notifications regarding card activity. In embodiments of the invention, the card processing system 260 may include functionality may have the capability to process card transactions on behalf of clients as a single submitter and the financial institution could manage settlement back to the customers separately from the normal card settlement process. This functionality would enable payment cards to be presented to the system for payment of invoices even if the customer does not have a card processing relationship. Furthermore, in the case of disbursements, customers may elect to store card information, such as a pre-paid card in their customer profile as a preferred destination for stored funds. It is within the scope of the invention that some senders of disbursements will allow a prepaid card as a destination and others will not.

The payroll system 270 may track payroll information for businesses and may also interact with the other disclosed systems. For example, the cash flow management system 100 may monitor the payroll system 260 and if it finds that a business will have difficulty making payroll, it may recommend a loan based on loan information available from the loan processing system 230. The payroll system 270 may also feed into the invoicing process. For example, if an employee or contractor is being paid for hours related to a particular job, those hours can be related to an appropriate invoice to support billing for time worked and recorded.

The offer system 280 may be a system that develops and presents customized offers for banking customers. The offers may include financial products tailored to the customer based on customer behaviors. For example, based on the customer's banking history, the offer system 280 may determine that the customer needs a line of credit or that the customer might be interested in various investment products. The offering of financial products is merely an example, as non-financial products may also be offered. In embodiments that will be further described herein, the offer system 280 may operate to generate offers for use in conjunction with electronic bills and disbursements.

The account records 250 may be contained in a hardware storage area and may include records of customer accounts with the host system 50. The customer accounts may include both business client and customer accounts and may include various types of accounts including checking, savings, investment, mortgage, other types of loan, credit accounts, etc. The account records 250 may be used in cooperation with embodiments of the invention in order to associate card expenditures or DDA account expenditures to an invoice billing the cost of materials to a customer. Furthermore, deposits to accounts may be associated with invoices generated through the system. The data contained in the account records 250 may also be useful for analysis required for generation of offers. Disbursements will be debited from the sender's account and credited to the recipient's account.

Figure 3:
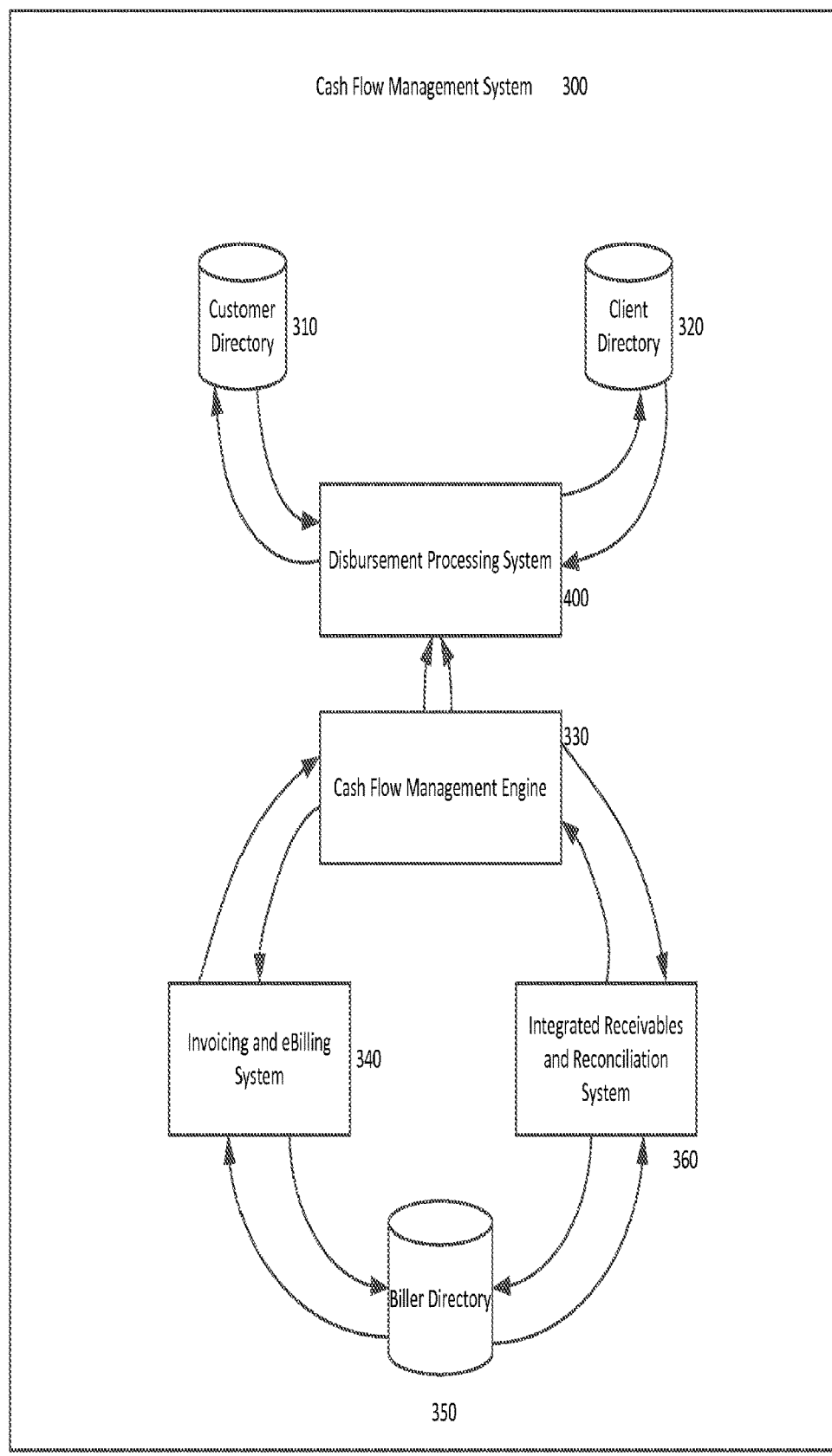
FIG. 3 is a block diagram illustrating interaction between a disbursement processing system and other components of the cash flow management system in accordance with embodiments of the invention.

FIG. 3 is a block diagram illustrating interaction between components of a cash flow management system 300 in accordance with an embodiment of the invention. A customer directory 310 stored in a hardware memory device may store customer information and may be available to other components of the cash flow management system 300 as well as to client and customer systems. A client directory 320 may be stored in the same or different computer memory device and may include an inventory of clients. The presence of the clients in the directory 320 enables the clients to be paid through and to make disbursements through a managed payment delivery mechanism, which may include, for example, an internal settlement process, electronic funds transfer through ACH, or use of check or electronic payment bundling to expedite delivery.

Clients and customers create entries to allow payment to various payees, which when created, are matched to entries in the directories that identify options for making payments, such as the amount of time required to deliver the payments and the payment methods supported. The payment methods may include, for example, internal DDA, external DDA, credit card, electronic payments, etc.

Business clients are enabled to make disbursements and customers are also enabled to accept disbursements through the use of the disbursement processing system 400. Through the use of the directories 310 and 320, the disbursement processing system 400 allows clients making disbursements to view their customers receiving disbursements. The directories 310 and 320 may also be published to third party payment service providers and billing service providers so that paying clients or customers can view these options when interacting with payment systems not associated with the host system. In embodiments of the invention, the directories create a history of payments associated by recipient. Accordingly, regardless of payment type, a payer, who may be a business client, can view disbursements by recipient.

An invoicing and electronic billing system 340 accesses and updates the directories. An integrated receivables management and reconciliation system 360 tracks disbursements and matches them with acceptances. A cash flow management engine 330 utilizes the information generated to update accounting systems utilized by the business clients to keep the business clients informed of their cash flow situations in real time via various user interfaces including a dashboard to provide information and allow interaction. Additionally, the cash flow management engine 330 interacts with other systems within the host system to gather data pertinent to the business clients and to provide a user interface to help business clients visualize their individual cash flow situations.

Figure 4:
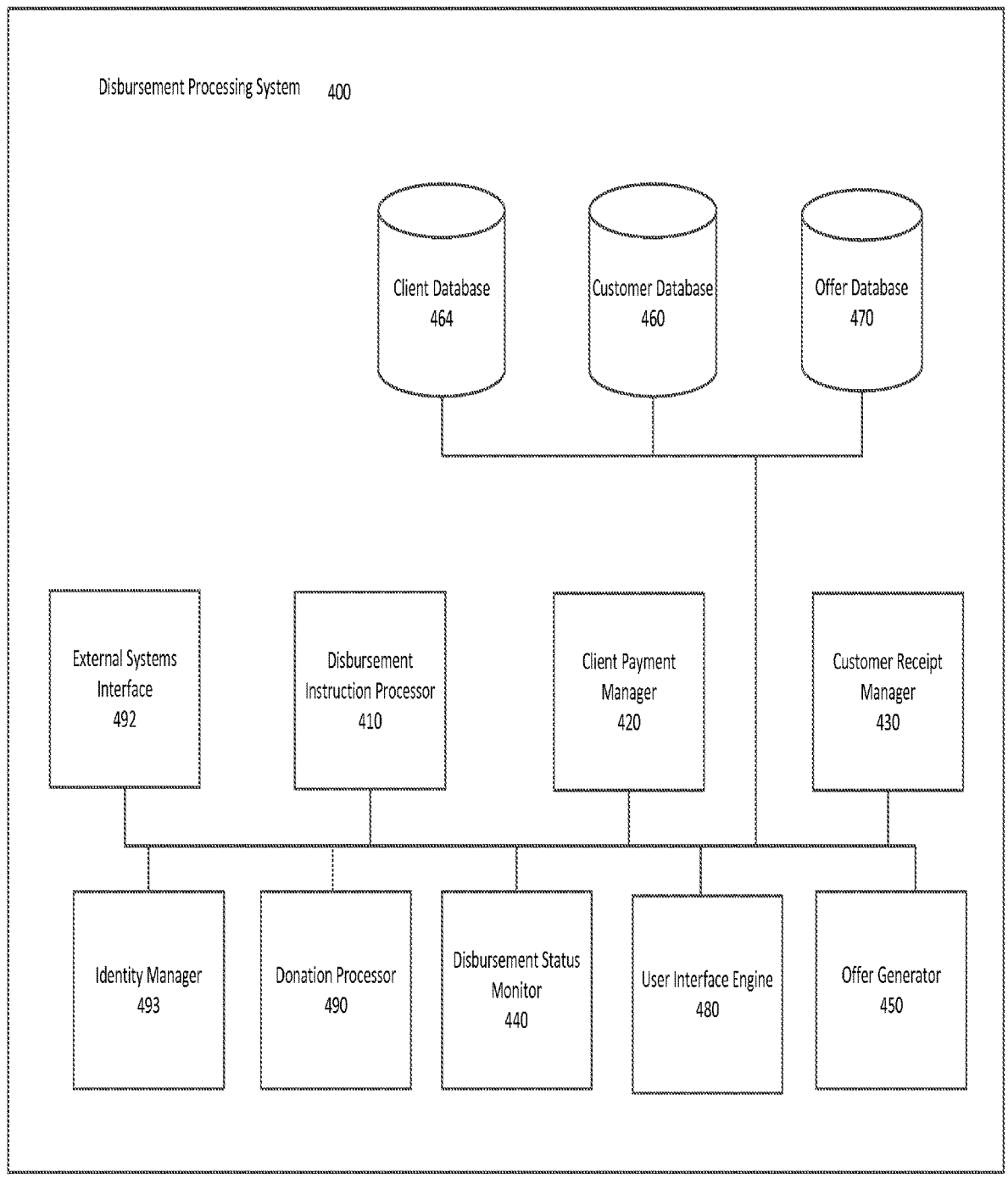
FIG. 4 is a block diagram illustrating components of the disbursement processing system in accordance with embodiments of the invention.

FIG. 4 is a block diagram illustrating an embodiment of the disbursement processing system 400. The disbursement processing system 400 may include a disbursement instruction processor 410 linked to a client payment manager 420, a customer receipt manager 430, a disbursement status monitor 440 and an offer generator 450. These components may also access a customer database 460, a client database 464, an offer database 470, a user interface engine 480, a donation processor 490, and an external systems interface 492.

The disbursement instruction processor 410 receives and processes the disbursement instruction from the business client system. In embodiments of the invention, the disbursement instruction processor 410 may receive a batch file of payment instructions to be processed through the system or individual transactions submitted from the business client system or the user interface by the owner or a delegate of the owner. Data required may be manually keyed in or automatically entered. The payment instructions will have an identifier for the recipient (email, mobile number, etc.), the payer's name, the payer's account information or account alias, the amount, a payment descriptor including a short memo on the purpose of the payment, disbursement details, and relevant offer codes. The payment may also include an expiration date. The disbursement instruction may also include branding information submitted by the business client. In preferred embodiments of the invention, the disbursement instruction processor preferably provides the business client with a user interface allowing the business client to enter information pertinent to the disbursement.

Furthermore, the instruction processor 410 may operate to flag suspicious data. For example a payment may originate from a client, but the account information doesn't match the expected account information. Every time that a transaction is accepted, the system can monitor data and launch an investigation if needed.

The payment manager 420 directs the payment as determined by the instruction processor and further generates and transmits a notification to the customer regarding the availability of the disbursement. The notification preferably provides the customer with the option to accept or decline the payment. The notification will be delivered through a channel determined by the sender's instructions in combination with any known preferences and communication devices for the recipient. The system will search for a channel by order of preference, and may, in embodiments of the invention, disallow channels deemed unacceptable by either the sender or the recipient. Preferably, the system will select a channel having a highest rank based on sender and recipient preferences for distribution. As will be further explained below, the payment manager 420 may also combine the notification with an offer tailored to the recipient of the payment.

The customer receipt manager 430 may provide user interfaces to customers to enable them to select preferred and alternate destinations for disbursements. For example, customers may want disbursements to go to a checking account, savings account, credit card, virtual account, or other location. In some instances, the number of options may be limited, but the customer receipt manager may enable the customer to select between whichever options are available. The payment manager 420 and the customer receipt manager 430 may also operate to match disbursements with payments redeemed. The receipt manager 430 may further access a stored customer profile that dictates handling of payments such as by directing the payments to a particular location.

The disbursement status monitor 440 monitors customer activity upon disbursement. In embodiments of the invention, the payment manager 420 provides customers with the option to accept or decline the disbursement. Some disbursements may be distributed with conditions, such as restrictions on how, when, or where a disbursement may be made. For example, a client such as an airline offering vouchers to travelers for an overbooked flight may restrict the redemption of the vouchers with temporal, geographic, or usage conditions. The airline may restrict the voucher geographically, by prohibiting the voucher from being redeemed outside the airport. Likewise, the airline may prohibit the voucher from being redeemed at certain merchants, at certain times, or for certain categories of spend. According to some embodiments, the categories of spend conditions may correspond to merchant codes.

In some embodiments, the conditions may be unacceptable to the recipient. In this instance, the recipient may exercise the option to decline the disbursement. In other instances, the recipient may simply ignore the disbursement. However, disbursements may be generated with expiration dates such that they must be accepted by the expiration date. In embodiments of the invention, upon expiration of the disbursement, the business client may generate a check to be mailed to the recipient or perform another disbursement method. In other embodiments of the invention, the disbursement itself may be subject to time limitations, such that the recipient will forfeit the disbursement if it is not accepted. The disbursement monitor 440 tracks the status of the disbursement and may generate reminders or notifications to both the business client and customer regarding the status of the disbursement. The disbursement monitor 440 may also generate notifications upon acceptance of the disbursement.

The disbursement status monitor 440 may also operate to flag suspicious activity after disbursement. Specifically, the disbursement status monitor 440 may gather temporal information (i.e., when) disbursements are redeemed or transferred after they are accepted by the customer, as well as contextual information (i.e., how, where, and to whom) the disbursements are redeemed or transferred. The disbursement status monitor 440 may then process this data to identify patterns suggestive of fraudulent activity. For example, if an airline disbursed numerous travel vouchers for an overbooked flight, and they were all redeemed at the same time, date, and merchant, then disbursement status monitor 440 may identify this as potentially fraudulent activity, or the merchant as a potentially fraudulent entity. In other embodiments, the disbursement status monitor 440, may also analyze data about the merchant and where the voucher was redeemed to identify suspicious activity. For example, if records show that a small merchant, such as a restaurant having a maximum seating capacity of 20 diners, redeemed over hundreds of vouchers at the same time, the disbursement status monitor 440 may flag the activity as suspicious, as it is unlikely a merchant that small could process a volume of vouchers that large. The disbursement status monitor 440 may detect anomalies by implementing other pattern recognition techniques well-known in the art.

As another example, the disbursement status monitor 440 may also detect suspicious activity by monitoring the customer's transfer of disbursements. Specifically, records may show that different customers immediately transfer their disbursements to the same third party. For example, five different customers may each transfer their disbursements to an independent third party within 30 seconds of receiving their disbursement. The disbursement status monitor 440 may detect that transfers to that same third party within such a short time span suggest fraudulent activity.

In some embodiments, the disbursement status monitor 440 may receive thresholds or rules that determine when activity may be determined as fraudulent. For example, if the number of vouchers disbursed and redeemed exceed a given threshold within a given window of time, the disbursement status monitor 440 may trigger the system to flag activity as suspicious. The offer generator 450 may be an integral part of the disbursement processing system 400, or alternatively, may be part of an external system accessed by the disbursement processing system 400 as shown in FIG. 2. The offer generator 450 may extract information from the disbursement instruction, search recent customer activity, search customer demographics, and perform analytic analysis on the collected information in order to generate targeted offers tailored to the customer. The offers may be from the business client making the disbursement or may alternatively originate from other business clients and may be contained within a database of current offers. The offers may include discounts on future purchases. The business client may be provided with the capability to define offers, which could include other incentives or discounts. The business client may tie the offer to the current disbursement. For example, the offer may require redemption of the disbursement and selection of another link. The offer generator 450 may obtain data from multiple sources, such as, for example, the expense management system, which stores line item data from purchases. The offer generator 450 may provide for tracking of offers and response rates enabling the business client to monitor customer behavior. Thus, the business client can view how many users received the offer and how many acted upon the offer. The offer generator 450 may further provide for automated fulfillment support. For example, the offer generator 450 may provide data to the business client pertaining to responders and may automatically apply a received discount to a subsequent invoice. In alternative embodiments, the business client may choose to forgo generation of offers. In this instance, the host system may implement the offer generator 450 to generate offers for the business client. The offer generator 450 may for example, generate offers for financial products such as loans, credit cards, or investment accounts. Other offers for non-financial products may also be generated. As a further alternative, the host system may sell the advertising space to other business clients so that an unrelated business client may generate offers using the offer generator 450 to target customers of other businesses. In embodiments of the invention, customers can choose to associate or link offers with a particular payment mechanism, such as a particular payment card. Thus, when customers accept an offer, through this linkage, the offer may automatically be applied. In other embodiments, the offers may be delivered to customers as scannable barcodes representing a discount or rebate. The offers may then be combined with purchase information to allow customers to redeem the offers immediately. For example, if a customer receives an offer for a rebate on an consumable good, such as a printer, the customer may redeem the offer by presenting the barcode to the merchant for instant redemption. The offer generator 450 may receive offers from business clients and store them in the offer database 470. When the offers expire, the offer generator 450 may remove the expired offers and replace them with current offers.

In embodiments of the invention, the offer generator 450 may provide information rather than offers. For example, the offer generator 450 may, based on a current user location, provide a list of local restaurants where a recipient can spend the received disbursement. The customer database 460, the client database 464, and the offer database 470 are contained within hardware storage areas and preferably store and accumulate information useful both to the host financial institution and the business clients in order to generate relevant offers. Information may be collected from a large number of available sources, including, for example, disbursement requests, account histories, and customer files including demographic customer information.

The customer database 460 may store customer profile information. Customers may keep accounts separate or link them together in a single profile. Customers may have multiple email addresses, each with a distinct profile. Customer profiles may specify destinations for payments and may further specify options such as preferred currency. One profile may accept multiple currencies or multiple distinct profiles for the same customer may be relegated to dealing with different currencies such as, for example, bitcoins, pounds, euros, or dollars. The customer profile may also store customer preferences for receiving disbursements. For example, the customer may elect to receive payments and notifications via email and/or mobile channels and the payments may be routed directly to a bank account, a prepaid card or prepaid account, or other type of card or account. In embodiments of the invention, the customer may rank multiple methods of receiving disbursements and/or notifications of disbursements. In operation, the system may evaluate the customer preferences with relation to the sender's preferences and select a method accordingly. Typically, the customer database 460 does not store a customer profile until the customer receives at least one payment from the system.

In order to register email addresses for new profiles, the system performs an authentication process. The system sends an activation code to the email address. Thus, the system is generally configured for receiving payments that customers are unaware of in advance and from sources that do not regularly send payments to the customer.

The data storage areas including the databases 460, 464, and 470 may include one or more databases stored in any convenient type of storage device. The data storage areas may include any hardware device suitable for storing the data and may further implement database tools for management of the data, such as for example, disbursement identifiers and business client and customer history information.

The disbursement processing system 400 also includes additional features, such as the user interface engine 480 that generates user interfaces for interaction with both clients and customers. In embodiments of the invention, a user interface is generated allowing disbursements to customers of the business client who are not customers of the host system. In particular, the system allows business clients distributing disbursements to add customization to a user interface so that customers, when reviewing a disbursement, may be directed to a web site that uses the business client's branding to present offers and other functionality. The host system may provide functionality in the form of a white label page for the business client to specify customized domains, upload logos or other graphics to display on the page, and allow for customized content or messaging. Thus, when customers of the business client access the web site using a link provided in a push notification or other location, the customers will view the customized information, which may include offers.

A donation processor 490 may be provided to allow business clients to solicit donations for charities in conjunction with disbursements. The donation processor 490 may, for example, offer business clients the option to provide an interface on the disbursement notification for donating some of the disbursement to a charity. A user interface may be provided for enabling selection of the charity. Alternatively, the business client may pre-select the charity. In embodiments of the invention, the donation processor 490 may direct the donations directly to the account of the charity. The donation processor 490 may also track and record monetary and other types of contributions.

An external systems interface 492 may allow for communication and data handling between the disbursement processing system 400 and external systems. The external system interface 492 provides for communication with systems outside of the electronic billing system, such as those systems within the host system shown in FIG. 2 or other external systems, such as payment service provider systems, biller systems, and payer systems. The external system interface 492 may operate to update the accounting system, regardless of its location, upon matching a redeemed disbursement with the disbursement notification. While the accounting system may be located within the host system accessible over the Internet, it may also be located externally and accessible over the internet by both the cash flow management system and the billers.

An identity management processor 493 may allow for the disbursement processing system 400 to implement identity binding and further enhance the ability of the system to detect and prevent suspicious and fraudulent activity. The identity management processor 493 may work in conjunction with the other components of the disbursement processing system 400 to disambiguate customers with multiple accounts or profiles. For example a customer may have multiple e-mail addresses or accounts in the customer database 460, customer directory 310, or account records 250. The identity management processor 493 enables the disbursement processing system 400 to associate this information with a single customer, thereby "binding" the information to a single identity. In some embodiments, a customer's different accounts may be associated with a biological or biometric feature of the customer. For example, the customer's name, address, e-mail, or similar information may be associated with a photo of the customer. Information such as the customer's photo may be stored and accessed from internal or external databases, such as their Facebook account.

One advantage of binding different accounts to a single identity is the ability to detect and prevent fraudulent activity. The identity management processor 493 may use a customer's account information in conjunction with customer identity information, such as their photograph, to ensure that disbursements are collected and redeemed by the right person. For example, an airline disbursing vouchers to travelers of an overbooked airline flight may retrieve and access the photograph of a customer associated with the name on a flight ticket. The airline personnel may then visually confirm that the person requesting the voucher matches the photo the airline has on file. Similarly, when the customer attempts to redeem a voucher at a merchant, the merchant may retrieve an image of the customer stored on file, and visually confirm that the image matches the customer redeeming the voucher. In this way, the disbursement processing system 400 may detect persons attempting identity fraud or misappropriation of the disbursements.

Figure 5A:
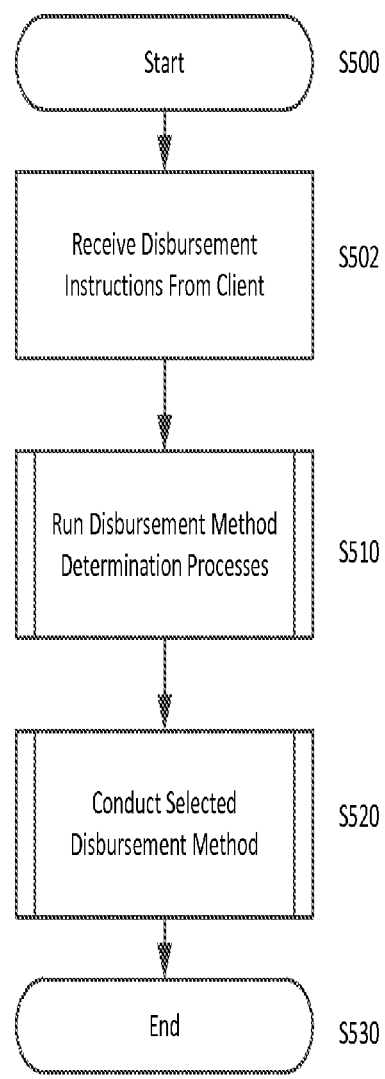
FIG. 5A is a flow chart illustrating a disbursement processing method in accordance with an embodiment of the invention.

FIG. 5A is a flow chart illustrating a method for disbursement processing in accordance with an embodiment of the invention. The method begins in S500 and in S502, the system receives disbursement instructions from the business client. Preferably, the system provides the business client with a user interface for entering or uploading data pertinent to the disbursement instruction and the business client is able to easily enter and submit the data to trigger the disbursement process. As set forth above, business clients may submit disbursement instructions individually or in a batch mode. Each disbursement instruction may include business client identification and a customer identifier, such as an email address and/or a mobile phone number. The disbursement instruction may also include a description of the general character of the disbursement. For example, the description may indicate if the disbursement is a rebate or refund and what type of product or service the disbursement is related to. For example, the disbursement may be related to home furnishings, auto parts, handyman services, electronics, etc. The disbursement instruction also includes an amount and business client account information. In S510, the system runs a disbursement method determination process based on the information contained in the disbursement instruction and information contained in the recipient profile. This process, as will be more fully explained with respect to FIG. 6, examines the payment capabilities and preferences of both the business client and the customer to determine the appropriate disbursement method. In S520, the system conducts the selected disbursement method. Conducting the disbursement method includes issuing a notification of the disbursement, monitoring the status of the disbursement, and issuing the actual disbursement by transferring the payment. The notification of the disbursement preferably includes a link for acceptance that leads to a confirmation of disbursement page. Thus, to complete acceptance of a disbursement, the recipient merely selects the link and performs no additional steps.

In embodiments of the invention, recipients are identified by email account. Thus, in order to keep funds separated, recipients may participate in the system with multiple email accounts. Thus, a payment recipient may use a work email address for reimbursements or payments from an employer and a personal email address for other payments. As an alternative to an email notification, payment recipients may have payment notifications waiting for them through a website hosted by a financial institution host server. Thus, payment recipients may be able to log into their accounts online and see that they have payments waiting. The payments may wait in a queue until the payment recipient selects a destination for the payment. The system also provides a mobile application so that payments can be made and received via mobile devices, such as tablets or smartphones. The process ends in S530.

Figure 5B:
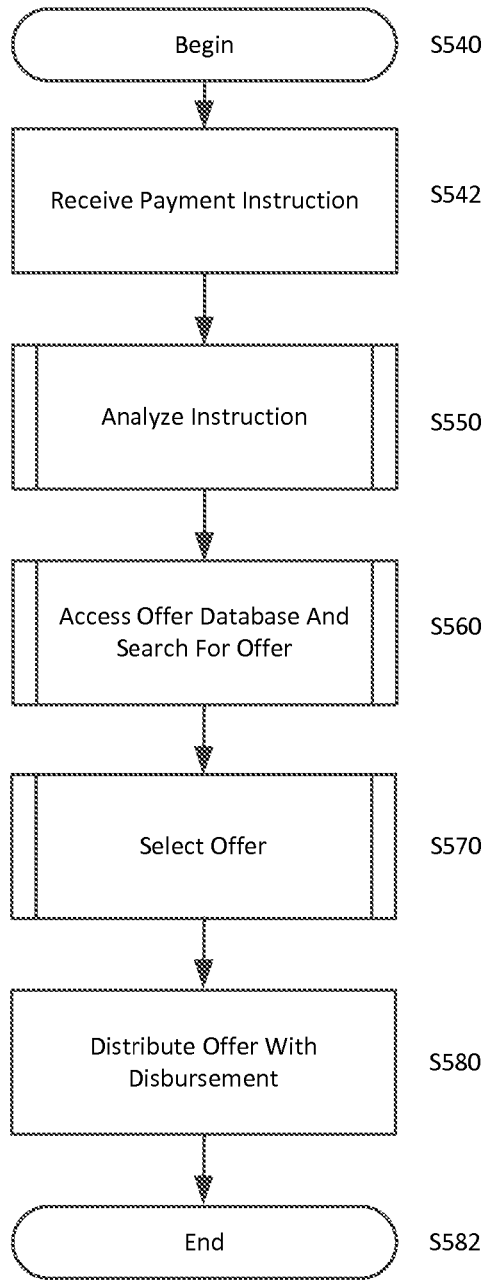
FIG. 5B is a flow chart illustrating a disbursement processing method in combination with offer generation in accordance with an embodiment of the invention.

FIG. 5B illustrates a process for offer generation that may occur in parallel to the disbursement generation process shown and described in connection with FIG. 5A. In S540, the process begins and the system receives the disbursement instruction in S542. In S550, the system analyzes the disbursement instruction. This analysis may include analyzing the recipient information to ascertain the recipient identity, searching for a recipient purchasing or account history based on the recipient identity, searching for a recipient profile, analyzing the purpose of the disbursement, and analyzing the business client profile and business client offerings. Based on the analyzed data, the system may search the offer data based on the analysis in S560 and extract at least one relevant offer in S570. The system may rank available offers and ask the business client for input regarding proposed offers. The system may additionally supply offers originating from other clients. In S580, the system distributes the offer with a disbursement notification. The offer may be distributed by embedding a link in a disbursement notification email. If the recipient selects the link, the recipient may be directed to an interface allowing the recipient to redeem the offer. As set forth above, the various user interfaces available to the recipient may be branded by the business client.

Once a payment is generated through the system in S580, the customer receiving the payment may receive a branded email explaining that a payment is waiting. (See FIG. 8.) For example, if Facebook® makes a payment to the customer, the customer may receive a branded email explaining that Facebook® has made a payment with the amount and the purpose, such as, for example, a vendor refund. The system would provide an interface allowing the recipient to accept the payment. The recipient may have pre-set, in a profile, a location for received payments. For example, the recipient may want the payment deposited directly in a bank account. Alternatively, the recipient may have a virtual spending card and may want the balance of that card augmented. Other transfer locations are within the scope of the invention. The system enables periodic reminders to customers who do not immediately accept payments and also the opportunity to decline payments. The opportunity to decline payments is useful in cases where the payment amount is insufficient or incorrect and the recipient does not want acceptance of the payment to represent an acknowledgement that full payment has been received.

In embodiments of the invention, the payments received could be "limited spend" payments. For example, if an airline loses luggage, the airline may reimburse the recipient with $200, but the $200 dollars may be limited to being spent on future air travel. This limited spend payment could be placed on a virtual card or in an account in which it is designated as "limited spend". The process ends in S582.

Figure 6:
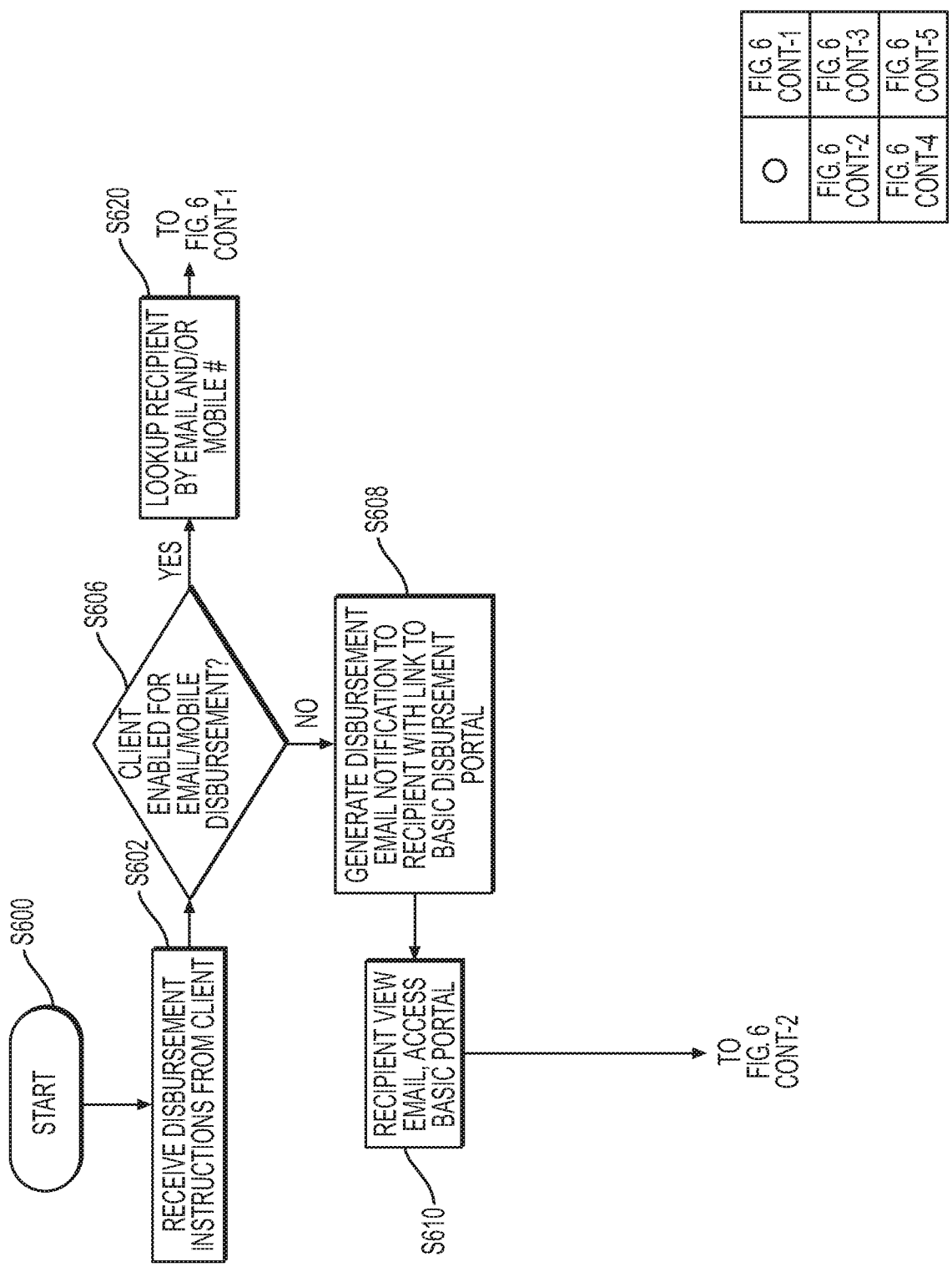
FIG. 6 is a flow chart illustrating further details of the disbursement processing method in accordance with an embodiment of the invention.

FIG. 6 is a flow chart illustrating further details of the disbursement processing method in accordance with a particular embodiment of the invention. The method starts in S600 and the system receives disbursement instructions from the business client in S602. As set forth above, the disbursement instruction may contain identifying information and metadata concerning the disbursement. In S606, the system determines if the business client requesting the payment is enabled for an electronic payment method, such as an email or mobile payment. In the embodiments of the invention, the electronic payment method is JPMorgan Chase's QuickPay® (QP), but other electronic payment methods, preferably suited for mobile devices, may also be available as preferred payment methods.

If, in S606, the business client is not enabled for an electronic payment method, then the system generates a disbursement notification to the recipient in S608 with a link to a payment portal. In S610, the recipient views the disbursement notification, which may be an email, and accesses the payment portal through a provided link. In S612, the system presents an interface with standard remittance options, such as ACH, and prepaid or virtual account remittance options. In S614, after receiving user input, the system disburses the funds through ACH or credit virtual account. In S616, if the disbursement is to a prepaid account, the system may determine if the customer has a card. If the customer does not have a card in S618, the system may initiate card fulfillment. If the customer does have a card, the disbursement is completed and the process ends in S694.

If in S606, the business client is enabled for electronic disbursement through email or to a mobile device, the system uses the customer information from the disbursement instruction to call a lookup interface in S620. For example, the system may utilize recipient identifying information, such as a recipient email address or recipient mobile number in S620. In S622, the system determines if the contact information of the recipient is recognized.

If the recipient is not recognized in S622, in S628, the system generates a disbursement notification to the recipient with a link to a payment portal. The recipient accesses the portal in S630 and another lookup is optionally performed in S632. This additional lookup is performed in the event that the recipient has enabled electronic payment options since the time of the most recent lookup. If the recipient has not subsequently enrolled in an email or mobile payment program as determined in S632, the system checks third party registries for recipient contact information in S634. Third party registry information may be stored, for example, in an electronic transfers clearinghouse. If third party registry information is not found in S636, the system presents disbursement detail with standard remittance options in S650 and proceeds with standard disbursement channels described above in S614.

If third party registry information is found in S636, the system presents the disbursement page with an option for mobile or email remittance in S650. If the customer chooses not to receive email or mobile remittance in S654, the system will proceed with the standard disbursement process of S614. However, if the recipient selects an email or mobile delivery in S654, the system stores the delivery preference in S656 and initiates payment processing in S660.

Returning to S622, if the system finds that the recipient contact information is recognized (and thus, both the business client and recipient are enabled for email or mobile delivery, the system determines if the recipient email address has a saved delivery preference in S624. If the recipient email address does not show a saved delivery preference in S624, the system generates a disbursement notification to the recipient with an option for email mobile delivery or a link to a basic portal for other options in S640. The recipient reviews the email and selects the disbursement option in S642. If the recipient selects the email mobile option in S642, the system presents a page to set the delivery preference in S656. However, if the recipient does not select the email or mobile option in S642, the system returns to S650 to present the disbursement detail with an option for email or mobile remittance in S650.

Returning to S660, if the email address does include a saved email or mobile preference, the system creates a payment for the recipient using the business client profile in S662. The system will also proceed to S664 to notify the recipient of the payment in S668. If the recipient selects the link to view disbursement details in S670, the recipient is presented with disbursement details and associated offers in S672.

If on the other hand, the user does not select the link to view details in S670 or does not select the offer in S676, the recipient may accept payment in S678 and the system may credit the recipient receiving account in S682 and provide reporting to the client for completed disbursements. The recipient may also decline the payment in S678, in which case the system notifies the business client of the declined or expired payment in S680.

If the recipient views the offer selected in S676, the system may present the recipient with an offer fulfillment page with redemption options in S684. If the recipient does not redeem the offer in S686, the system proceeds to S678 where the recipient can accept or decline the payment. If the recipient does redeem the offer in S686, the system may be operable to deduct the balance from the disbursement as applicable in S690. If any balance is remaining in S692, the recipient may again have the opportunity to accept the payment. If no disbursement balance remains, the process may end in S692. Thus, the method illustrated in FIG. 6 enables quick, efficient, payment when preferred electronic payment methods are enabled by both the business client and the recipient. The system thus encourages enrollment in order to facilitate payments.

Figure 7:
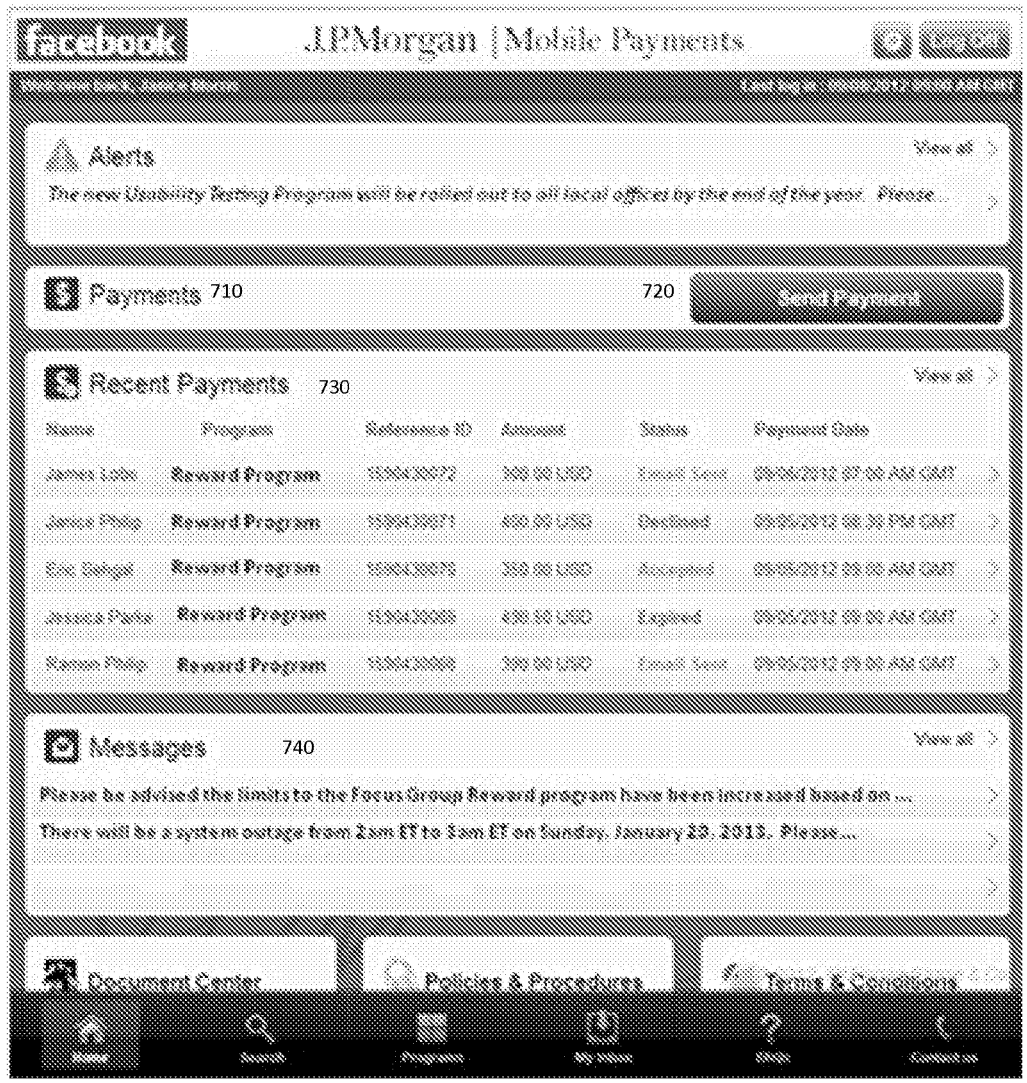
FIG. 7 is a user interface illustrating a business client mobile device landing page in accordance with an embodiment of the invention.

FIG. 7 is a user interface 700 illustrating a business client mobile device landing page in accordance with an embodiment of the invention. The user interface 700 may appear on a mobile device, such as a smartphone or a tablet. The mobile landing page may be co-branded. In the illustrated embodiment, the mobile landing page is co-branded between Facebook® and JPMorgan Chase®. The mobile landing page may include an alerts section 702, a payments section 710, a "send payment" option 720, a list of recent payments 730, and messages 740.

The alerts section 702 may include any kind of alerts related to disbursement notification, disbursement acceptance or disbursement expiration. The alerts section 702 may also include alerts related to offer generation or acceptance or alerts related to overall system status.

The payments section 710 may allow the business clients to access a customer list and formulate disbursement instructions. For example, upon selecting the send payment option 720, the business client may formulate a disbursement request to a selected customer.

The list 730 of recent payments may include the payee name, the program, such as a rewards program, a reference ID, amount, status and payment date. In embodiments of the invention, the interface may also present search capabilities, such that system users can view the status of payments. For example, the user may view only declined payments, expired payments, or accepted payments.

The messages 740 may include communications to system users. For example, in the displayed embodiment, the message advises system users of a system outage and of new limits on rewards programs. In addition to the messages 740, other communications such as alerts and documents may also be included.

Figure 8:
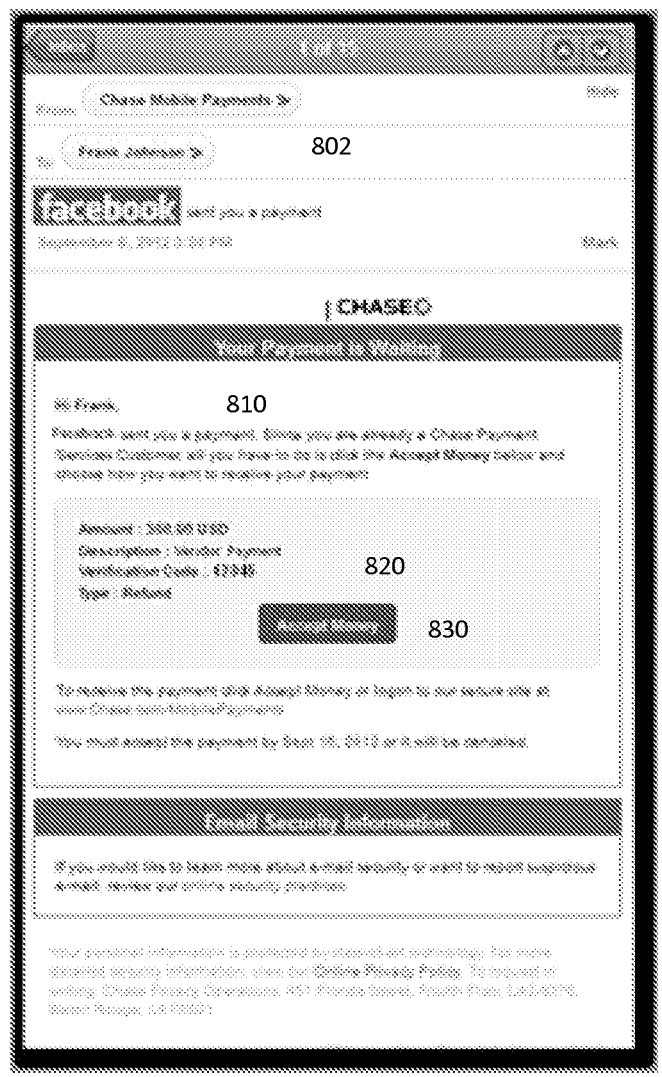
FIG. 8 is a user interface illustrating a customized disbursement notification email in accordance with embodiments of the invention.

FIG. 8 is a user interface 800 illustrating a customized disbursement notification email in accordance with embodiments of the invention. As set forth above, the notification email may also be co-branded. In the illustrated embodiment, the email is co-branded between JPMorgan Chase® and Facebook®. A message 810 explains to a payment recipient that a payment is waiting. The message 810 explains how to accept the payment. Acceptance of the payment should be simple and seamless, preferably involving only one customer step. Upon activating the acceptance button, the customer may link to a website showing a confirmation that the payment is being processed. No other action is required on the part of the customer. The link preferably contains data that allows the website to identify the customer and the specific disbursement for processing, thus avoiding the need for further action or data entry by the customer. Data 820 describes the payment to provide the customer with familiarity. The data 820 may include an amount, a description, a verification code, and a type of payment. In the illustrated embodiment, the payment is a vendor payment that refunds $300 to the recipient. The message 800 also provides an option 830 to accept the payment. Further information is provided explaining that the payment will expire if not accepted and describing any additional available methods for accepting the money.

Figure 9:
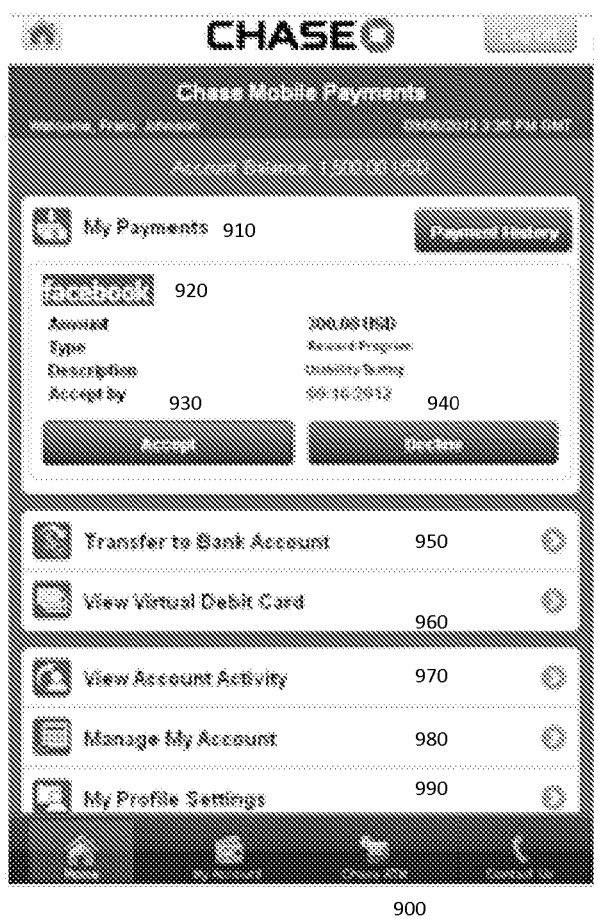
FIG. 9 is a user interface illustrating a customer landing page for disbursement review in accordance with an embodiment of the invention.

FIG. 9 is a user interface 900 illustrating a customer landing page for disbursement review in accordance with an embodiment of the invention. The landing page 900 may also be co-branded, with the current embodiment illustrating co-branding between JPMorgan Chase® and Facebook®. The presentation of the landing page may be based on customer enrollment in the disbursement system. Thus, upon receiving the initial disbursement notification, customers may be given an opportunity to enroll, but may not be presented with the landing page. On the landing page 900, a payment history section 910 may allow a customer to access a list of recent payments. A payment description section 920 may provide information about a payment currently available for acceptance and the terms and conditions of the payment. As illustrated, a $300 payment from a rewards program is awaiting acceptance and has an acceptance deadline. An option 930 is provided to accept the payment and an option 940 allows the customer to decline the payment. Customers may view terms and conditions attached to the payment and may want to decline the payment when the terms and conditions are not acceptable. For example, terms and conditions may specify that the payment is a full reimbursement and the customer may believe the payment is insufficient. In this instance, the customer would decline the payment. Upon acceptance of the payment, various selectable options including transfer to a bank account 950, viewing of a virtual debit card 960, viewing account activity 970, managing account 980, and profile settings 990 may be provided. Similar options may be provided if the customer declines the payment. For the bank account transfer option 950, the account may be a virtual account, a credit account, a traditional savings, checking account, or any other type of account. The profile settings 990 may allow the customer to create or modify the customer profile, which includes settings, details, and default options. For viewing of account activity 970, customers may be enabled to view payment history along with details accompanying each payment.

Thus, once the disbursement is made, the customer receives a branded email explaining the payment including the amount. The email may include a high level explanation and amount of payment. For example, the payment may be a vendor payment for a refund. The email may also link to website to accept the payment that also provides additional details and an opportunity to enroll in a person-to person payments plan and in embodiments of the invention, to create a profile dictating the handling of payments. After enrollment, customers are presented with the personalized landing page of FIG. 9.

Typically, customers are not enrolled until they accept an offer for enrollment upon accepting a payment. At the time of enrollment, the customer profile may be developed with customer input to include profile information and default settings. Enrolled customers may see terms and conditions and financial accounts records upon viewing a payment.

In instances where the customer declines the payment, the system may ascertain the reason and operate accordingly. For example, if the customer declines the payment due to unacceptable terms and conditions, the system may issue a subsequent communication and request for input. However, if the customer declines the payment simply because the customer does not want to receive the payment through the interface, the business client may pay the customer in an ordinary manner, such as by providing a check.

If the customer views the payment, but ignores it, the system may generate reminders. The system may log the fact that an email has been viewed, but that the payment has not been accepted. The system may send repeated reminders prior to the expiration date until the customer acts.

Figure 10:
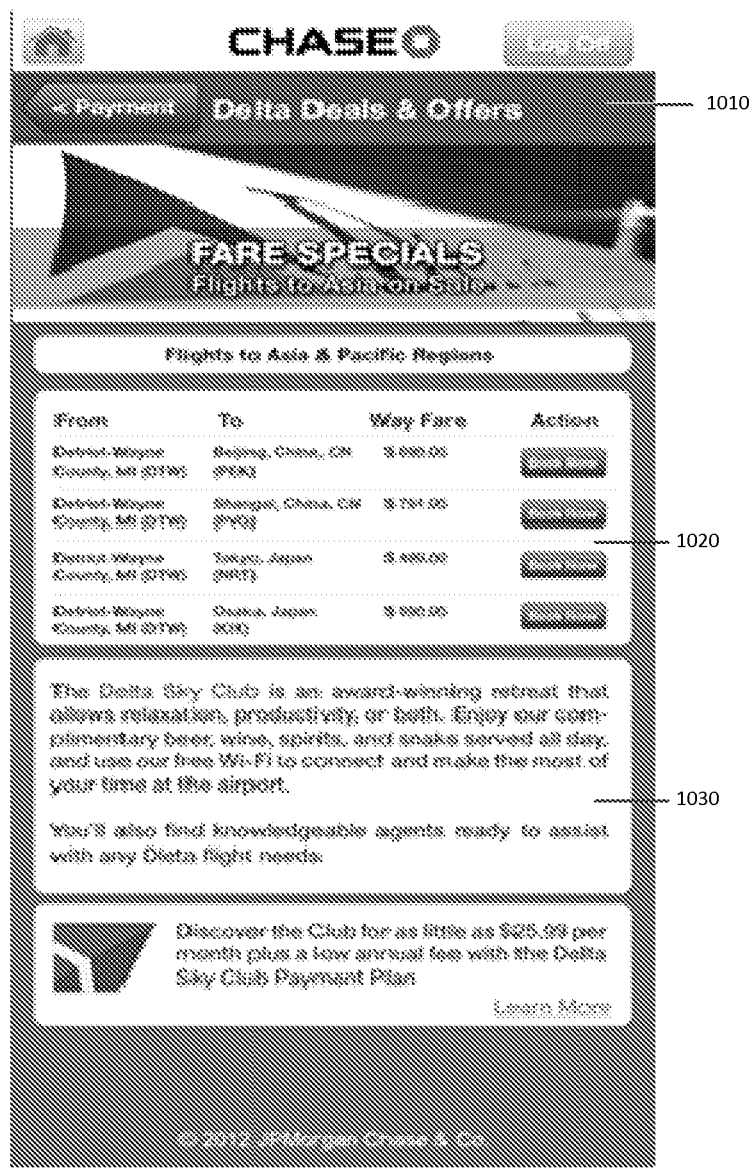
FIG. 10 is a user interface illustrating branded deals and offers in accordance with an embodiment of the invention.

FIG. 10 is a user interface 1000 that includes client branded deals and offers. Such deals and offers 1010 may be provided upon payment notification or when a customer accepts a payment. The illustrated offer is co-branded between Delta and Chase. The offer provides flight specials 1020 illustrating branded deals and offers in accordance with an embodiment of the invention. Customers may be provided with immediate booking opportunities and further may be provided with information 1030 to explain the deals and offers and provide information about the sponsor of the deals and offers.

This system and method as described herein can be utilized in many industries. For example, the system has utility in the travel industry, particularly in the context of cruise lines and airlines. In the cruise line industry, the system can be utilized to facilitate onboard refunds. In the airline industry, refunds or rebates may be due in instances where flights are overbooked and customers are denied boarding, or in cases in which the airlines compensate customers for lost luggage, or hotel and food costs during delays.

The system also has applicability in the automobile sales industry. Automobile sales are frequently accompanied by various marketing programs, such as cash back incentive programs or cash back rebate programs. Additionally, automobile financing solutions periodically require refunds on overpayment of loans. While these rebates are currently provided to automobile distributors by check or on prepaid cards, the disbursement process can be expensive for the distributors. Using the system of the invention, automobile distributors would more easily and inexpensively be able to transfer disbursements to customers.

The system and method of the invention may additionally be useful in the insurance industry to enable insurers to more easily provide refunds for overpayment of premiums and payment of insurance claims. The payments may be single payments, recurring payments, in batch, or individual. In a related context, shippers, such as UPS® or FedEx® may utilize the system to address claims for lost or damaged packages as current processes for addressing these claims are complicated.

In a further context, utility companies may also utilize the system and method of the invention to provide refunds for overpayment of bills, refunds for corrections or service outages or royalty payments. In yet an additional context, non-profit entities may utilize the system for collection of donations. Governmental entities may utilize the system for collection of taxes and refund of overpayments. Higher educational institutions may utilize the system refund overpayment when a loan is applied and for collection of tuition.

The system as illustrated in the block diagrams and flowcharts of FIGS. 1-6 includes one or more computer processors capable of accessing stored data and instructions to perform various steps and may operate in conjunction with software modules described herein in order to perform various functions. Many processors may be suitable and will be further described below. All of the described engines, generators, and other components may be or include software modules that are executed by the processor to perform their stated functions. Although the software modules are shown as discrete components, they may be integrated in various ways in accordance with embodiments of the invention.

All of the components shown in the FIGS. above may be, include, or be implemented by a computer or multiple computers. The system of the invention or portions of the system of the invention may be in the form of a "processing machine," i.e. a tangibly embodied machine, such as a general purpose computer or a special purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be characterized as a program, software program, or simply software.

As noted above, the processing machine, which may be constituted, for example, by the particular system and/or systems described above, executes the instructions that are stored in the memory or memories to process data. This processing of data may be in response to commands by a user or users of the processing machine, in response to previous processing, in response to a request by another processing machine and/or any other input, for example. As noted above, the processing machine used to implement the invention may be a general purpose computer. However, the processing machine described above may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform. It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

Embodiments of the invention are particularly useful in the context of high volume, low value payments. The system and method may be used, for example, for rebates and refunds in connection with automobile purchases, airline rebates for damaged baggage or cancellations, airline vouchers for hotels or restaurants, or cruise line rebates. The system may also be used in connection with insurance payments for payment of claims or premium refunds. As set forth above, the system may also be used in connection with donation collection and tax refunds.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

While particular embodiments of the invention have been illustrated and described in detail herein, it should be understood that various changes and modifications might be made to the invention without departing from the scope and intent of the invention.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the disclosed invention.

What is claimed is:

1. A computing apparatus comprising:
    a memory comprising programmed instructions stored thereon; and
    at least one processor coupled to the memory and configured to execute the stored programmed instructions to:
        receive a disbursement instruction over a network from a first client computing system having a first mobile application that relates to a disbursement distribution stored thereon, and to process the disbursement instruction to use customer identification data extracted from the disbursement instruction to determine, by accessing a customer profile in a customer database, when at least one available payment channel for the customer includes an electronic payment channel;
        select an offer based on the disbursement instruction;
        make a disbursement in accordance with the disbursement instruction using the at least one payment channel, and send an electronic disbursement notification to the customer via a second mobile application that relates to a disbursement notification that is stored on a second client computing system associated with a customer, the notification including access to the selected offer, the notification prompting acceptance of the disbursement by including a selectable acceptance button, and the notification including a link to a viewing of at least one disbursement detail on a web site;
        monitor acceptance of the disbursement and notify the customer via the second mobile application when the disbursement expires without acceptance, obtain redemption data, and detect at least one pattern that corresponds to fraudulent activity based on the obtained redemption data; and
        generate at least one alert to be transmitted to at least one from among the first mobile application and the second mobile application when a disbursement status changes to at least one from among an issued status, an accepted status, a declined status, and an expired status.

2. The computing apparatus of claim 1, wherein the at least one processor is further configured to execute the stored programmed instructions to receive a batch file of disbursement instructions.

3. The computing apparatus of claim 1, wherein the at least one processor is further configured to execute the stored programmed instructions to receive a single disbursement instruction.

4. The computing apparatus of claim 1, wherein each disbursement instruction includes a customer identifier including at least an email address or a mobile phone number.

5. The computing apparatus of claim 1, wherein the disbursement instruction further includes a business client brand, the business client account information, and a disbursement description.

6. The computing apparatus of claim 1, wherein the at least one processor is further configured to execute the stored programmed instructions to select the offer by extracting information from the disbursement instruction including customer data and client data, and to access an offer database, select at least one offer based on the extracted information, and correlate the offer with the disbursement.

7. The computing apparatus of claim 1, wherein the at least one processor is further configured to execute the stored programmed instructions to generate multiple offers with a single disbursement instruction.

8. The computing apparatus of claim 1, wherein at least one processor is further configured to execute the stored programmed instructions to direct the disbursement to an appropriate location.

9. The computing apparatus of claim 8, wherein the location is a virtual account.

10. The computing apparatus of claim 7, wherein the virtual account has limited spend capabilities.

11. The computing apparatus of claim 1, wherein the disbursement notification includes a co-branded user interface explaining the disbursement.

12. The computing apparatus of claim 11, wherein the user interface allows selection of location for the disbursement including one of a virtual account, bank account, a prepaid card, and a credit card.

13. The computing apparatus of claim 11, wherein the user interface allows the customer to decline payment.

14. The computing apparatus of claim 1, wherein the at least one processor is further configured to execute the stored programmed instructions to direct the disbursement in accordance with rules stored in the customer profile.

15. A method for managing electronic disbursements transferred from a business client of a financial institution to customers of the business client, the method comprising:
    receiving, by the at least one computer processor, a disbursement instruction from a business client system over a network, and causing the disbursement instruction to be processed by a first mobile application that relates to a disbursement distribution, the first mobile application processing the disbursement instruction to perform processes including:

analyzing, by the at least one computer processor, the disbursement instruction to extract customer identification information;

using, by the at least one computer processor, the customer identification information to determine, by accessing a customer profile in a customer database, when at least one available payment channel for the customer includes an electronic payment channel; and selecting, by the at least one computer processor, an offer based on the disbursement instruction;

making, by the at least one computer processor, a disbursement in accordance with the disbursement instruction using the at least one available payment channel and sending an electronic notification to the customer of the disbursement, the notification prompting acceptance of the disbursement by including a selectable acceptance button, and the notification including a link to a viewing of at least one disbursement detail on a web site;

monitoring, by the at least one computer processor, acceptance of the disbursement by the customer and notifying the business client when the disbursement expires without acceptance by the customer, obtaining redemption data, and detecting at least one pattern that corresponds to fraudulent activity based on the obtained redemption data; and generating, by the at least one computer processor, at least one alert to be transmitted to the customer when a disbursement status changes to at least one from among an issued status, an accepted status, a declined status, and an expired status.

\* \* \* \* \*